(12) United States Patent
Voss et al.

(10) Patent No.: US 8,800,268 B2
(45) Date of Patent: Aug. 12, 2014

(54) ZONE COATED FILTER, EMISSION TREATMENT SYSTEMS AND METHODS

(75) Inventors: Kenneth Voss, Somerville, NJ (US); Ingemar Gottberg, Gottenburg (SE); Steve Truesdail, Madison, AL (US); Marius Vaarkamp, Burlington, NJ (US)

(73) Assignee: BASF Corporation, Florham Park, NJ (US)

( * ) Notice: Subject to any disclaimer, the term of this patent is extended or adjusted under 35 U.S.C. 154(b) by 815 days.

(21) Appl. No.: 11/947,324

(22) Filed: Nov. 29, 2007

(65) Prior Publication Data

US 2008/0141661 A1 Jun. 19, 2008

Related U.S. Application Data

(60) Provisional application No. 60/868,289, filed on Dec. 1, 2006.

(51) Int. Cl.
*F01N 3/00* (2006.01)
*F01N 3/10* (2006.01)
*F01N 3/02* (2006.01)
*F01N 3/20* (2006.01)
*B01D 53/94* (2006.01)
*F01N 3/035* (2006.01)
*F01N 13/00* (2010.01)

(52) U.S. Cl.
CPC ........ *F01N 3/2066* (2013.01); *B01D 2257/702* (2013.01); *B01D 53/944* (2013.01); *F01N 2330/30* (2013.01); *Y02T 10/24* (2013.01); *F01N 2610/02* (2013.01); *F01N 2510/065* (2013.01); *F01N 3/035* (2013.01); *B01D 2257/404* (2013.01); *B01D 2257/502* (2013.01); *B01D 53/9477* (2013.01); *F01N 13/009* (2014.06); *B01D 2258/012* (2013.01); *F01N 2570/18* (2013.01); *B01D 53/9413* (2013.01); *B01D 2255/102* (2013.01); *F01N 2330/60* (2013.01); *F01N 2340/00* (2013.01); *B01D 2251/2062* (2013.01)
USPC .................. 60/286; 60/274; 60/295; 60/297; 60/301; 60/303; 60/311

(58) Field of Classification Search
USPC ........... 60/274, 286, 295, 297, 301, 303, 311; 422/169–172, 177, 182
See application file for complete search history.

(56) References Cited

U.S. PATENT DOCUMENTS 4,329,162 A  5/1982  Pitcher, Jr.
4,655,037 A * 4/1987  Rao ................................ 60/274

(Continued)

FOREIGN PATENT DOCUMENTS

DE  3907939 A1  8/1990
EP  1617051 A1  1/2006

(Continued)

OTHER PUBLICATIONS

PCT International Search Report—PCT/US2007/086095, 6 pgs.

(Continued)

*Primary Examiner* — Thomas Denion
*Assistant Examiner* — Diem Tran
(74) *Attorney, Agent, or Firm* — Melanie L. Brown

(57) ABSTRACT

Exhaust treatment filters, systems, and methods are disclosed. According to one or more embodiments, a particulate filter is zone coated with an oxidation catalyst and is used in an emission treatment system or method including a NOx reducing catalyst and an optional $NH_3$ destruction catalyst.

32 Claims, 5 Drawing Sheets

(56) References Cited

U.S. PATENT DOCUMENTS

| | | | |
|---|---|---|---|
| 4,934,142 A | 6/1990 | Hayashi et al. | |
| 4,961,917 A | 10/1990 | Byrne | |
| 5,041,270 A | 8/1991 | Fujitani et al. | |
| 5,100,632 A | 3/1992 | Dettling | |
| 5,221,484 A | 6/1993 | Goldsmith et al. | |
| 5,279,997 A | 1/1994 | Montreuil et al. | |
| 5,462,907 A | 10/1995 | Farrauto et al. | |
| 5,491,120 A | 2/1996 | Voss et al. | |
| 5,516,497 A | 5/1996 | Speronello et al. | |
| 5,746,989 A | 5/1998 | Murachi et al. | |
| 5,758,496 A | 6/1998 | Rao et al. | |
| 5,866,210 A | 2/1999 | Rosynsky et al. | |
| 5,875,057 A | 2/1999 | Kato | |
| 5,963,832 A | 10/1999 | Srinivasan et al. | |
| 5,974,791 A * | 11/1999 | Hirota et al. | 60/276 |
| 6,171,557 B1 * | 1/2001 | Takahashi et al. | 422/177 |
| 6,471,924 B1 | 10/2002 | Feeley et al. | |
| 6,478,874 B1 | 11/2002 | Rosynsky et al. | |
| 6,753,294 B1 * | 6/2004 | Brisley et al. | 502/439 |
| 6,805,849 B1 | 10/2004 | Andreasson et al. | |
| 6,813,884 B2 | 11/2004 | Shigapov et al. | |
| 6,820,414 B2 | 11/2004 | Stroia et al. | |
| 6,823,663 B2 | 11/2004 | Hammerle et al. | |
| 6,826,906 B2 | 12/2004 | Kakwani et al. | |
| 6,892,529 B2 * | 5/2005 | Duvinage et al. | 60/286 |
| 6,928,806 B2 * | 8/2005 | Tennison et al. | 60/286 |
| 6,938,411 B2 * | 9/2005 | Hoffmann et al. | 60/295 |
| 6,953,554 B2 * | 10/2005 | Wallin et al. | 422/177 |
| 7,062,904 B1 | 6/2006 | Hu et al. | |
| 7,078,074 B2 | 7/2006 | Matsuzawa et al. | |
| 7,086,220 B2 * | 8/2006 | Imai et al. | 60/274 |
| 7,097,817 B2 * | 8/2006 | Brisley et al. | 423/245.3 |
| 7,104,049 B2 * | 9/2006 | Hiranuma et al. | 60/295 |
| 7,225,613 B2 * | 6/2007 | Hammerle et al. | 60/297 |
| 7,426,825 B2 | 9/2008 | Viola et al. | |
| 7,490,464 B2 * | 2/2009 | Li et al. | 60/295 |
| 7,621,981 B2 * | 11/2009 | Blackwell et al. | 95/273 |
| 7,772,151 B2 * | 8/2010 | Li et al. | 502/339 |
| 8,220,251 B2 * | 7/2012 | Oger et al. | 60/286 |
| 2001/0026838 A1 | 10/2001 | Dettling et al. | |
| 2004/0001781 A1 | 1/2004 | Kumar et al. | |
| 2004/0024894 A1 | 2/2004 | Osman et al. | |
| 2004/0219077 A1 | 11/2004 | Voss et al. | |
| 2005/0031514 A1 | 2/2005 | Patchett et al. | |
| 2005/0056004 A1 | 3/2005 | Kakwani et al. | |
| 2005/0069476 A1 | 3/2005 | Blakeman et al. | |
| 2005/0129601 A1 | 6/2005 | Li et al. | |
| 2006/0039843 A1 | 2/2006 | Patchett et al. | |
| 2006/0057046 A1 | 3/2006 | Punke et al. | |
| 2006/0162323 A1 | 7/2006 | Hammerle et al. | |
| 2006/0179825 A1 | 8/2006 | Hu et al. | |
| 2006/0260296 A1 | 11/2006 | Theis | |
| 2006/0272319 A1 * | 12/2006 | Dettling et al. | 60/295 |
| 2008/0127638 A1 | 6/2008 | Vaarkamp et al. | |
| 2009/0241521 A1 * | 10/2009 | Kim et al. | 60/295 |

FOREIGN PATENT DOCUMENTS

| | | | |
|---|---|---|---|
| JP | 1982-171425 | | 10/1982 |
| JP | 10-202105 | | 8/1998 |
| JP | 2002276337 | | 9/2002 |
| WO | WO-99/39809 | | 8/1999 |
| WO | WO-02/14657 A1 | | 2/2002 |
| WO | WO 2005/016497 | | 2/2005 |
| WO | WO 2006-056811 | * | 6/2006 |

OTHER PUBLICATIONS

PCT Written Opinion—PCT/US2007/086095, 6 pgs.

Enger, et al., SAE Technical Paper Series 860007—"Catalytically Activated Diesel Particulate Traps—New Development and Applications", (Feb. 1986).

Punke, et al., Presentation: "Catalyzed Soot Filters in Close Coupled Position for Passenger Vehicles"—presented at SAE 2006 World Congress, (Apr. 2006).

Punke, et al., Article: "Catalyzed Soot Filters in Close Coupled Position for Passenger Vehicles"—presented at SAE 2006 World Congress, (Apr. 2006).

Punke, et al., Presentation: "Catalyzed Soot Filters for Light Duty Diesel Vehicles"—presented at Le 1er Forum sur les systemes d'echappement, Paris, (Jun. 2005).

Presentation: "Catalyzed Diesel Particulate Filter—A Key Technology to Meet Future Emission Standards"—presented at The 4th Advanced Diesel Engines Technology Symposium, Seoul, South Korea, (Oct. 2004).

Punke, et al., Presentation: "Catalyst Development for Soot Filters in Close Coupled Positions"—presented at 3rd International Exhaust Gas and Particulate Emissions Forum, (Sep. 2004).

"USPTO Non-Final Office Action mailed Sep. 29, 2009 in U.S. Appl. No. 11/947,409", 14 pgs.

Final Office Action in U.S. Appl. No. 11/947,409, dated Apr. 14, 2010, 11 pp.

* cited by examiner

ZONE COATED FILTER, EMISSION TREATMENT SYSTEMS AND METHODS

CROSS REFERENCE TO RELATED APPLICATION

This application claims the benefit of U.S. Provisional Patent Application Ser. No. 60/868,289, filed on Dec. 1, 2006, the disclosure of which is hereby incorporated by reference in its entirety.

FIELD OF THE INVENTION

Embodiments of the invention relate generally to diesel exhaust treatment filters, systems, and methods. More particularly, embodiments of the present invention pertain to diesel exhaust treatment systems and methods that include zone coated particulate filters having a zone coated with an oxidation catalyst.

BACKGROUND

Compression ignition diesel engines have great utility and advantage as vehicle power trains because of their inherent fuel economy and high torque at low speed. Diesel engines run at a high air to fuel (A/F) ratio under very fuel lean conditions. Because of this, they have very low emissions of gas phase hydrocarbons and carbon monoxide. However, diesel exhaust is characterized by relatively high emissions of nitrogen oxides ($NO_x$) and particulates. Diesel engine exhaust is a heterogeneous mixture which contains not only gaseous emissions such as carbon monoxide ("CO"), unburned hydrocarbons ("HC") and nitrogen oxides ("$NO_x$"), but also condensed phase materials (liquids and solids) which constitute the so-called particulates or particulate matter. Emissions treatment systems for diesel engines must treat all of the components of the exhaust to meet emissions standards set by various regulatory agencies throughout the world.

The total particulate matter emissions of diesel exhaust contain three main components. One component is the solid, dry, carbonaceous fraction or soot fraction. This dry carbonaceous fraction contributes to the visible soot emissions commonly associated with diesel exhaust. A second component of the particulate matter is the soluble organic fraction ("SOF"). The SOF can exist in diesel exhaust either as a vapor or as an aerosol (fine droplets of liquid condensate) depending on the temperature of the diesel exhaust. It is generally present as condensed liquids at the standard particulate collection temperature of 52° C. in diluted exhaust, as prescribed by a standard measurement test, such as the U.S. Heavy Duty Transient Federal Test Procedure. These liquids arise from two sources: (1) lubricating oil swept from the cylinder walls of the engine each time the pistons go up and down; and (2) unburned or partially burned diesel fuel. The third component of the particulate matter is the so-called sulfate fraction, which is formed from small quantities of sulfur components present in the diesel fuel.

Catalyst compositions and substrates on which the compositions are disposed are typically provided in diesel engine exhaust systems to convert certain or all of these exhaust components to innocuous components. For instance, oxidation catalysts, which, in diesel engine systems may be referred to as diesel oxidation catalysts (DOCs), containing platinum group metals, base metals and combinations thereof, facilitate the treatment of diesel engine exhaust by promoting the conversion of both unburned hydrocarbons (HC) and carbon monoxide (CO) gaseous pollutants, and some proportion of the particulate matter through oxidation of these pollutants to carbon dioxide and water. Such catalysts have generally been disposed on various substrates (e.g., honeycomb flow through monolith substrates), which are placed in the exhaust of diesel engines to treat the exhaust before it vents to the atmosphere. Certain oxidation catalysts also promote the oxidation of NO to $NO_2$.

In addition to the use of oxidation catalysts, diesel particulate filters are used to achieve high particulate matter reduction in diesel emissions treatment systems. Known filter structures that remove particulate matter from diesel exhaust include honeycomb wall flow filters, wound or packed fiber filters, open cell foams, sintered metal filters, etc. However, ceramic wall flow filters, described below, receive the most attention. These filters are capable of removing over 90% of the particulate material from diesel exhaust.

Typical ceramic wall flow filter substrates are composed of refractory materials such as cordierite or silicon-carbide. Wall flow substrates are particularly useful to filter particulate matter from diesel engine exhaust gases. A common construction is a multi-passage honeycomb structure having the ends of alternate passages on the inlet and outlet sides of the honeycomb structure plugged. This construction results in a checkerboard-type pattern on either end. Passages plugged on the inlet axial end are open on the outlet axial end. This permits the exhaust gas with the entrained particulate matter to enter the open inlet passages, flow through the porous internal walls and exit through the channels having open outlet axial ends. The particulate matter is thereby filtered on to the internal walls of the substrate. The gas pressure forces the exhaust gas through the porous structural walls into the channels closed at the upstream axial end and open at the downstream axial end. The accumulating particles will increase the back pressure from the filter on the engine. Thus, the accumulating particles have to be continuously or periodically burned out of the filter to maintain an acceptable back pressure.

Catalyst compositions deposited along the internal walls of the wall flow substrate assist in the regeneration of the filter substrates by promoting the combustion of the accumulated particulate matter. The combustion of the accumulated particulate matter restores acceptable back pressures within the exhaust system. Soot combustion can be passive (e.g., with catalyst on the wall flow filter and adequately high exhaust temperatures), though for many applications active soot combustion is also required (e.g., production of a high temperature exotherm in the exhaust up-stream of the filter). Both processes utilize an oxidant such as $O_2$ or $NO_2$ to combust the particulate matter.

Passive regeneration processes combust the particulate matter at temperatures within the normal operating range of the diesel exhaust system. Preferably, the oxidant used in the regeneration process is $NO_2$ since the soot fraction combusts at much lower temperatures than those needed when $O_2$ serves as the oxidant. While $O_2$ is readily available from the atmosphere, $NO_2$ can be generated through the use of upstream oxidation catalysts to oxidize NO in the exhaust stream. An example of a passive regeneration process is disclosed in U.S. Pat. Nos. 6,753,294 and 7,097,817

Active regeneration processes are generally needed to clear out the accumulated particulate matter, and restore acceptable back pressures within the filter. The soot fraction of the particulate matter generally requires temperatures in excess of 500° C. to burn under oxygen rich (lean) conditions, which are higher temperatures than those typically present in diesel exhaust. Active regeneration processes are normally initiated by altering the engine management to raise temperatures in front of the filter up to 500-630° C. Depending on driving mode, high exotherms can occur inside the filter when the cooling during regeneration is not sufficient (low speed/low load or idle driving mode). Such exotherms may exceed 800° C. or more within the filter. One common way that has been developed to accomplish active regeneration is the introduction of a combustible material (e.g., diesel fuel) into the exhaust and burning it across a flow-thru diesel oxidation catalyst (DOC) mounted up-stream of the filter. The exotherm from this auxiliary combustion provides the sensible heat (e.g. about 500-700° C.) needed to burn soot from the filter in a short period of time (e.g. about 2-20 min.).

An example of a system is shown in U.S. Pat. No. 6,928, 806. The DOC functions during active regeneration mode to light-off and burn fuel injected into the low temperature (e.g., about 250-300° C.) exhaust (directly or via the engine) and thereby produce an exotherm to heat the exhaust entering the particulate filter to the temperatures required (about 500-650° C.) to combust accumulated soot from the filter, thereby regenerating the filter to reduce the operating pressure drop across the filter associated with the soot accumulation.

High material costs associated with platinum group metal-containing compositions augment the need to slow or prevent the degradation of catalyst coatings due to active regeneration events. Catalyst coatings disposed on wall flow filters often contain platinum group metal components as active catalyst components to ensure acceptable conversions of the gaseous emissions (HC, CO) of the diesel exhaust to innocuous components (e.g., $CO_2$, $H_2O$). The loadings of such components are generally adjusted so that the catalyst substrate meets emissions regulations even after catalyst aging. Consequently, coating designs that maximize the efficiency and durability of platinum group metal usage along the substrate are desirable.

Certain conventional coating designs for wall flow substrates have a homogeneous distribution of catalyst coating along the entire axial length of the internal walls. In such designs the platinum group metal concentrations are typically adjusted to meet the emissions requirements under the most stringent conditions. Most often such conditions refer to the catalyst's performance after the catalyst has aged. The cost associated with the required platinum group metal concentration is often higher than is desired.

As can be appreciated from the above, current particulate filter systems pose a number of issues concerning precious metals material costs and degradation of the catalyst on the particulate filter due to exposure to high temperatures. Accordingly, it would be desirable to provide alternatives diesel engine in exhaust treatment systems and methods that alleviate one or more of these issues.

SUMMARY

According to an embodiment of the invention, an emission treatment system is provided which includes a particulate filter and a NOx reducing catalyst. In one or more embodiments, the particulate filter is provided which comprises a substrate having a plurality of passages and elements for trapping particulate contained in an exhaust stream flowing through the filter, the substrate having an inlet end and an outlet end, the inlet end of the substrate having a quantity of precious group metal composition disposed thereon to light off fuel at a temperature of less than about 300° C. and to produce an exotherm sufficient to burn off trapped particulate in the filter. In one embodiment, the precious group metal is present in a loading amount of at least about 20 g/ft$^3$ and extends for less than about 50% of the axial length of the filter. In another embodiment, the precious group metal is present in a loading amount of at least about 30 g/ft$^3$ and extends for less than about 50% of the axial length of the filter. In another embodiment, the precious group metal is present in a loading amount of at least about 40 g/ft$^3$ and extends for less than about 50% of the axial length of the filter. In a specific embodiment, the substrate is in the form of a wall flow monolith having a plurality of longitudinally extending passages bounded by longitudinally extending walls, the passages comprising inlet passages having an open inlet end and a closed outlet end, and outlet passages having a closed inlet end and an open outlet end, the walls having a porosity of at least 40% with an average pore size of at least 5 microns and precious group metal composition permeating the walls and extending from the inlet end towards the outlet end to a length that is less than the axial length of the walls to provide an inlet zone.

In one or more embodiments, the longitudinally extending walls have a catalytic coating thereon underlying the precious group metal composition, the catalytic coating extending the entire axial length of the filter. In one embodiment, the catalytic composition comprises a base metal oxide. The catalytic composition may comprise a precious group metal composition in an amount less than or equal to about 20 g/ft$^3$.

Another embodiment pertains to an emission treatment system for treatment of an exhaust stream comprising $NO_x$ and particulate matter, the emission treatment system comprising a particulate filter having an axial length and elements for trapping particulate matter contained in an exhaust stream flowing through the filter a light-off oxidation catalyst composition extending from the inlet end towards the outlet end to a length that is less than the axial length of the walls to provide an inlet zone in an amount sufficient to light-off at less than about 300° C. and generate an exotherm to burn soot trapped in the filter; and a NOx reducing catalyst located downstream from the particulate filter.

According to an embodiment of the invention, an emission treatment system for treatment of an exhaust stream comprising NOx and particulate matter is provided. The system comprises a wall flow monolith disposed within the exhaust stream and having a plurality of longitudinally extending passages bounded by longitudinally extending walls, the passages comprising inlet passages having an open inlet end and a closed outlet end, and outlet passages having a closed inlet end and an open outlet end, the walls having a porosity of at least 40% with an average pore size of at least 5 microns. The wall flow monolith further comprises a light-off oxidation catalyst composition permeating the walls and extending from the inlet end towards the outlet end to a length that is less than the axial length of the walls to provide an inlet zone. The system further comprises a NOx reducing catalyst located downstream from the wall flow monolith. In certain embodiments, the system may include an $NH_3$ destruction catalyst located downstream from the $NO_x$ reducing catalyst.

In one or more embodiments, the NOx reducing catalyst comprises a lean NOx catalyst. In embodiments including a lean NOx catalyst, the system may further comprise a reductant introduction port in fluid communication with a hydrocarbon reductant, the reductant introduction port located upstream from the lean $NO_x$ catalyst. In other embodiments, the NOx reducing catalyst comprises a lean $NO_x$ trap.

In one or more embodiments, the NOx reducing catalyst comprises an SCR catalyst. In embodiments including an SCR catalyst, the system may include an optional introduction port located upstream from the SCR catalyst, the introduction port in fluid communication with an ammonia source or ammonia precursor. The system may further include an injector in fluid communication with the introduction port, the injector configured to periodically meter the ammonia or an ammonia precursor into the exhaust stream.

In one or more embodiments, the system may further include an $NH_3$ destruction catalyst located downstream from the SCR catalyst. The system may also include an exotherm-producing agent introduction port located upstream of the wall flow monolith, the exotherm-producing agent introduction port in fluid communication with an exotherm-producing agent capable of generating a temperature sufficient to periodically burn particulate accumulated in the wall-flow monolith. The exotherm-producing agent may comprise a fuel such as diesel fuel.

Another embodiment of the invention pertains to a method of treating exhaust stream from a diesel engine comprising disposing within the exhaust stream containing particulate matter a wall flow monolith and having a plurality of longitudinally extending passages bounded by longitudinally extending walls, the passages comprising inlet passages having an open inlet end and a closed outlet end, and outlet passages having a closed inlet end and an open outlet end, the walls having a porosity of at least 40% with an average pore size of at least 5 microns and the wall flow monolith comprising a light-off oxidation catalyst composition permeating the walls and extending from the inlet end towards the outlet end to a length that is less than the axial length of the walls to provide an inlet zone. The method may further comprise disposing a NOx reducing catalyst downstream from the wall flow monolith and periodically introducing an exotherm-producing agent upstream of the wall flow monolith to generate an exotherm in the wall flow monolith sufficient to combust particulate matter trapped within the wall flow monolith.

DETAILED DESCRIPTION

Definitions

Figure 1A:
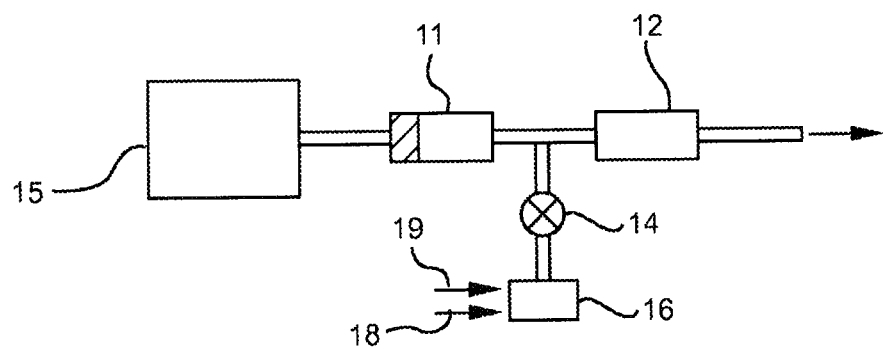
FIG. 1A is a schematic illustration of an emission treatment system in accordance with an embodiment of the invention.

The following terms shall have the meanings set for below:

"Activated alumina" has its usual meaning of a high BET surface area alumina, comprising one or more of gamma-, theta- and delta aluminas.

"BET surface area" has its usual meaning of referring to the Brunauer, Emmett, Teller method for determining surface area by $N_2$ absorption. Unless otherwise specifically stated, all references herein to the surface area of the catalyst support components or other catalyst components means the BET surface area.

"Bulk form," when used to describe the physical form of a material (e.g., ceria), means the material is present as discrete particles that can be as small as 1 to 15 microns in diameter or smaller, as opposed to having been dispersed in solution onto another material such as gamma alumina. By way of example, in some embodiments of the invention, particles of ceria are admixed with particles of gamma alumina so that ceria is present in bulk form, as opposed to, for example, impregnating alumina particles with aqueous solutions of ceria precursors which upon calcination are converted to ceria disposed on the alumina particles.

"Cerium component" means one or more oxides of cerium (e.g., $CeO_2$).

"Downstream" and "Upstream," when used to describe an article, catalyst substrate or zone, refer to the relative positions in the exhaust system as sensed in the direction of the flow of the exhaust gas stream.

"High surface area support" means support materials with a BET surface area that is approximately greater than 10 $m^2/g$, preferably greater than 150 $m^2/g$.

"Platinum group metal component" or "PGM" refers to the platinum group metals or oxides thereof. Preferred platinum group metal components are platinum, palladium, rhodium iridium components, and combinations thereof.

"Diesel oxidation catalyst" or "DOC" refers to a catalyst promoting oxidation processes in diesel exhaust, to reduce emissions of the organic fraction of diesel particulates, gas-phase hydrocarbons, and/or carbon monoxide.

"Active regeneration" refers to the introduction of a combustible material (e.g., diesel fuel) into the exhaust and burning it across an oxidation catalyst to generate an exotherm from that provides heat (e.g. about 500-700° C.) needed to burn particulate matter such as soot from the filter An ammonia destruction catalyst or AMOX refers to a catalyst that promotes the oxidation of $NH_3$ to ideally nitrogen but in general to a mixture of nitrogen NOx and $N_2O$.

"Particulate filter" is a filter designed to remove particulate matter from an exhaust gas stream such as soot, and particulate filters include, but are not limited to honeycomb wall flow filters, partial filtration filter, a wire mesh filter, wound fiber filters, sintered metal filters; and foam filters.

Before describing several exemplary embodiments of the invention, it is to be understood that the invention is not limited to the details of construction or process steps set forth in the following description. The invention is capable of other embodiments and of being practiced or being carried out in various ways.

According to one or more embodiments of the invention, a separate, upstream light-off oxidation catalyst is eliminated from a diesel engine emission treatment system and incorporated directly onto a particulate filter itself by placing light-off/oxidation catalyst components in the inlet end of the filter channels extending an adequate length from the inlet end towards the outlet end of the filter. In this way, during active regeneration, the introduced combustible fuel is lit-off and burnt on the inlet end of the filter, thus producing the necessary exotherm at a temperature of about 500-700° C. within the filter to combust accumulated soot in the filter.

According to embodiments of the invention, active regeneration can be accomplished by or on the filter alone, and the need for a separate light-off oxidation catalyst in the system is eliminated. Eliminating a component from the system provides a benefit of eliminating a substrate and associated canning of the system. In turn, this elimination of a separate component reduces overall system volume, and potentially reduces the amount of expensive precious group metal (PGM) required for the system. Furthermore, providing an integrated light-off/oxidation catalyst on the particulate filter reduces the overall system back-pressure on the engine, which is associated with fuel consumption. In addition, in systems that include a $NO_x$ reducing catalyst, for example an SCR catalyst or lean NOx catalyst downstream from the integrated light-off oxidation/particulate filter provides a greater amount heat for these downstream devices compared to systems in which the particulate filter and particulate soot filter are provided as separate components. The integrated light-off oxidation/particulate filter can be moved closer to the engine. Reducing the size of the system by integrating the oxidation catalyst and soot filter reduces the heat loss from the particulate filtering sub-system, thereby allowing any downstream component to operate at higher temperature. Higher temperatures generally result in higher catalytic activity, and therefore, integrating the oxidation catalyst in the particulate filter will likely result in better performance of the NOx removal components downstream of the particulate filtering sub-system.

When the NOx reducing catalyst uses $NH_3$ or an $NH_3$ precursor as the reducing agent, a separate injector can be provided upstream of the SCR catalyst. With the fuel addition point (for filter regeneration) provided downstream of the SCR catalyst, the nitrogen reducing catalyst is not exposed to the extreme temperatures associated with the active regeneration of the particulate filter. The absence of high temperature exposure caused by forced filter regenerations allows a smaller SCR catalyst volume with corresponding cost saving and packaging advantages. Further, the absence of the high temperature exposure enables a broader range of materials to be used for the SCR catalyst composition. For example, vanadium materials can be used in place of or together with zeolites, to reduce the cost of the SCR catalyst and improve its effectiveness. In addition, an ammonia destruction catalyst can be integrated onto the outlet end of the substrate having the SCR catalyst, which would eliminate the need for a separate ammonia destruction catalyst. In a further system optimization, the $NH_3$ destruction catalyst can be integrated into the soot filter either as zone or a uniform coating. By doing so the over all system volume is reduced with a corresponding cost and packaging advantages.

Integration of the light-off/oxidation catalyst function and particulate removal functions into a single catalyst article is accomplished using a wall flow substrate coated with a light-off oxidation catalyst composition. The light-off/oxidation catalyst composition contains a sufficient loading of precious group metal composition to achieve light-off at a temperature less than about 300° C. (e.g., from about 220° C. to 300° C.). to generate an exotherm to burn soot collected in the filter. Temperatures generated by the exotherm typically are between about 500° C. and 700° C. Although there may be a number of ways to incorporate the light-off/burning function onto the particulate filter itself, one method would be to apply this function to the particulate filter as a zone of catalyst on the up-stream, inlet end of the particulate filter substrate (e.g. honeycomb, wall-flow filter substrate). This inlet catalytic zone which will be exposed to relatively low exhaust temperatures 220-300° C.) and will have to have a high enough catalytic activity to accomplish the light-off, plus reasonably complete combustion of the injected fuel to produce the high temperatures, for example, about 500-700° C. required for filter regeneration. Although there are a variety of catalyst compositions that can accomplish this, an exemplary composition would be comprised of precious group metals (PGM's) dispersed on a suitable support and at a loading level suitable to light-off and burn the injected fuel, and is described in more detail below. The inlet zone will typically extend at least 10% of the axial length of the filter, and in various embodiments, the inlet zone extends at least about 20%, 25%, 30%, 35%, 40%, 45%, 50% or up to about 75% of the axial length of the filter. The inlet zone may be directly on the walls of the filter, or the inlet zone may be formed over a catalytic coating that extends the entire axial length of the filter. The underlying catalytic coating may be a base metal oxide such as an oxide of copper, cobalt, chromium, cerium, etc. or a precious group metal composition. In embodiments in which the underlying coating is a precious group metal composition, the loading is typically less than or equal to 10 $g/ft^3$. Thus, the particulate filter may have a catalytic coating of platinum or other suitable precious group metal at a loading of 10 $g/ft^3$ covering the entire axial length of the walls of the filter and a second coating extending from the inlet end for only a portion of the axial length of the filter at a higher loading sufficient to light-off and produce the exotherm to burn off soot collected in the filter.

An embodiment of the inventive emission treatment system is shown in FIG. 1A. As can be seen in FIG. 1A, the exhaust containing gaseous pollutants (including unburned hydrocarbons, carbon monoxide and NOx) and particulate matter is conveyed from the engine 15 to a particulate filter 11 comprising wall elements having a light-off oxidation catalyst composition permeating at least an inlet zone of the walls as will described further below. In the light-off oxidation catalyst permeating the walls of the particulate filter 11, unburned gaseous and non-volatile hydrocarbons (i.e., the SOF) and carbon monoxide are largely combusted to form carbon dioxide and water. Removal of substantial proportions of the VOF using the oxidation catalyst, in particular, helps prevent deposition of excessive particulate matter on the particulate filter 11, which could become clogged by excessive particulate matter. In addition, a substantial proportion of the NO of the NOx component is oxidized to $NO_2$ in the oxidation catalyst portion of the particulate filter 11. The particulate matter including the soot fraction and the VOF are also largely removed (greater than 80%) by the particulate filter. The particulate matter deposited on the particulate filter is combusted through active regeneration of the filter, which process is aided by the presence of the integrated DOC composition.

Downstream of the particulate filter 11 a reductant, for example, ammonia, is injected as a spray via a nozzle (not shown) into the exhaust stream. Aqueous urea shown on one line 18 can serve as the ammonia precursor which can be mixed with air on another line 19 in an optional mixing station 16. An introduction port or valve 14 can be used to meter precise amounts of aqueous urea which are converted in the exhaust stream to ammonia. The exhaust stream with the added ammonia is conveyed to a NOx-reducing catalyst 12, shown as an SCR catalyst, which may be coated on an appropriate substrate such as a honeycomb. On passing through the reducing catalyst 12, the NOx component of the exhaust gas stream is converted through the selective catalytic reduction of NOx with ammonia to nitrogen.

Depending on the desired level of NOx removal, one or more NOx reducing catalysts can be disposed downstream of the NOx reducing catalyst 12. For example, the additional SCR catalyst may be disposed on a monolithic, honeycomb flow through substrate, a ceramic foam substrate or metallic substrate downstream of the NOx reducing catalyst 12.

Figure 1B:
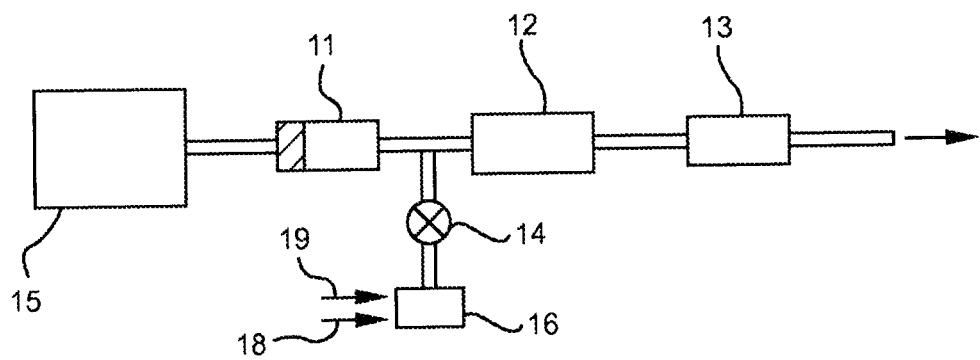
FIG. 1B is a schematic illustration of an emission treatment system in accordance with another embodiment of the invention.

An optional configuration is shown in FIG. 1B where the emission treatment system is provided with an $NH_3$-destruction catalyst such as a slip oxidation catalyst 13 downstream of the NOx reducing catalyst 12, shown as an SCR catalyst. The slip oxidation catalyst can be coated, for example, with a composition containing base metals and less than 0.5 wt % of platinum. This provision can be used to oxidize any excess $NH_3$ before it is vented to the atmosphere. According to one or more embodiments, the $NH_3$-destruction catalyst may be disposed on the particulate filter.

Wall Flow Substrates

The particulate filter may be embodied in many forms. For example, the particulate filters may be in the form of a honeycomb wall flow filter, a partial filtration filter, a wire mesh filter, a wound fiber filter, a sintered metal filters and a foam filter. In specific embodiments, the particulate filter is a wall flow filter. Wall flow substrates useful for supporting the oxidation catalyst compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. Wall flow substrates typically have a wall thickness between 0.002 and 0.1 inches. Examples of suitable wall flow substrates have a wall thickness of between 0.002 and 0.015 inches.

Figure 2:
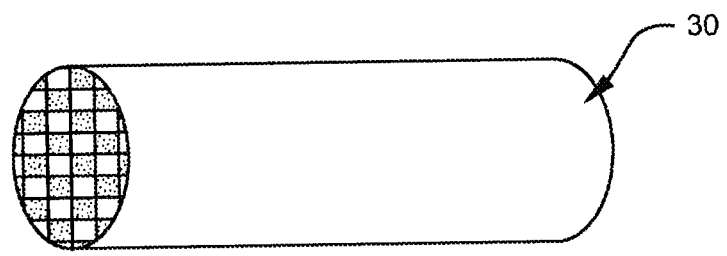
FIG. 2 is a perspective view of a wall flow filter substrate.
Figure 3:
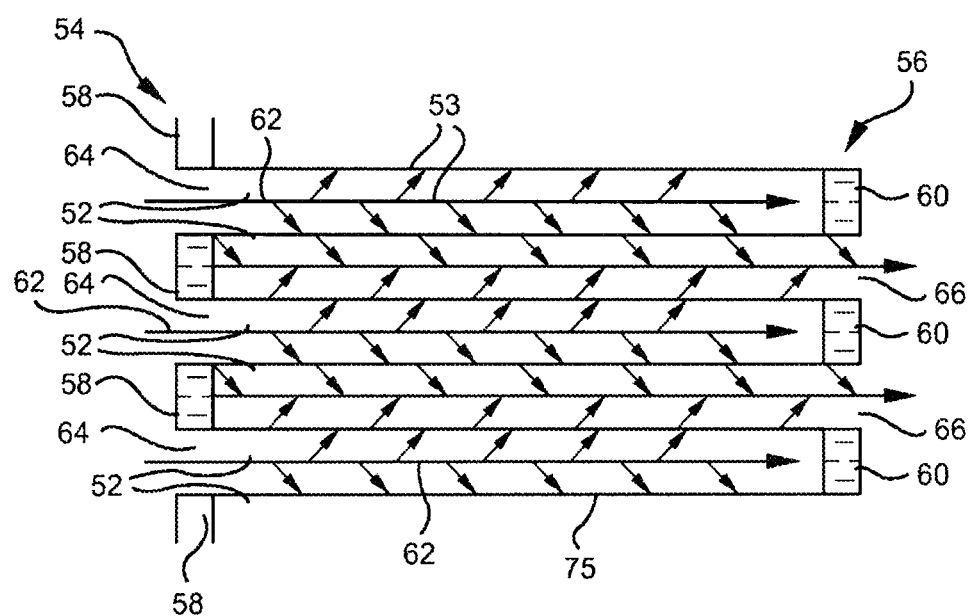
FIG. 3 is a section view of a wall flow filter substrate.

FIGS. 2 and 3 illustrate a wall flow filter substrate 30 which has a plurality of passages 52. The passages are bounded or enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58.

Suitable wall flow filter substrates are composed of ceramic-like materials such as cordierite, α-alumina, silicon carbide, silicon nitride, zirconia, mullite, spodumene, alumina-silica-magnesia, aluminum titanate or zirconium silicate, or of porous, refractory metal. Wall flow substrates may also be formed of ceramic fiber composite materials. Examples of suitable wall flow substrates are formed from cordierite and silicon carbide. Such materials are able to withstand the environment, particularly high temperatures, encountered in treating the exhaust streams.

Suitable wall flow substrates for use in the inventive system include thin porous walled honeycombs (monolith)s through which the fluid stream passes without causing too great an increase in back pressure or pressure across the article. According to embodiments of the invention, ceramic wall flow substrates used in the system are formed of a material having a porosity of at least 40% (e.g., from 50 to 75%) having a mean pore size of at least 5 microns (e.g., from 5 to 30 microns). In certain embodiments, the substrates have a porosity of at least 55% and have a mean pore size of at least 10 microns. When substrates with these porosities and these mean pore sizes are coated with the techniques described below, adequate levels of SCR catalyst compositions can be loaded onto the substrates to achieve excellent NOx conversion efficiency. These substrates are still able retain adequate exhaust flow characteristics, i.e., acceptable back pressures, despite the DOC catalyst loading. U.S. Pat. No. 4,329,162 is herein incorporated by reference with respect to the disclosure of suitable wall flow substrates. Wall flow substrates can also be metallic, i.e. have no porosity, and the pore size is typically lower than of a wall flow filter.

The porous wall flow filter used according to embodiments of the invention is catalyzed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. To coat the wall flow substrates with the DOC catalyst composition, the substrates are immersed vertically in a portion of the catalyst slurry such that the top of the substrate is located just above the surface of the slurry. In this manner, slurry contacts the inlet face of each honeycomb wall, but is prevented from contacting the outlet face of each wall. This results in a portion of the walls on the inlet end of the substrate being coated, forming an inlet zone. The substrate is removed from the slurry, and excess slurry is removed from the wall flow substrate first by allowing it to drain from the channels, then by blowing with compressed air (against the direction of slurry penetration), and then by pulling a vacuum from the direction of slurry penetration. By using this technique, the catalyst slurry permeates the walls of the substrate, yet the pores are not occluded to the extent that undue back pressure will build up in the finished substrate. As used herein, the term "permeate" when used to describe the dispersion of the catalyst slurry on the substrate, means that the catalyst composition is dispersed throughout the wall of the substrate, and not just on an outer surface of the wall as a coating layer. The coating can be applied by any suitable technique, such as by immersing the substrate into the coating a using a vacuum to draw the coating up into the channels of the substrate, as described in U.S. Pat. Nos. 6,478,874; 5,866, 210 and 5,963,832, the entire of each patent incorporated herein by reference.

After coating with catalyst, the substrates are dried typically at least about 100° C. and calcined at a higher temperature (e.g., 300 to 450° C.). After calcining, the catalyst loading can determined be through calculation of the coated and uncoated weights of the substrate. As will be apparent to those of skill in the art, the catalyst, loading can be modified by altering the solids content of the coating slurry. Alternatively, repeated immersions of the substrate in the coating slurry can be conducted, followed by removal of the excess slurry as described above.

Oxidation Catalyst Compositions

The oxidation catalyst formed on the particulate filter can be formed from any composition that provides effective combustion of unburned gaseous and non-volatile hydrocarbons (i.e., the VOF) and carbon monoxide. In addition, the oxidation catalyst should be effective to convert a substantial proportion of the NO of the NOx component to $NO_2$. As used herein, the term "substantial conversion of NO of the NOx component to $NO_2$" means at least 20%, and preferably between 30 and 60%. Catalyst compositions having these properties are known in the art, and include platinum group metal- and base metal-based compositions. An example of oxidation catalyst composition that may be used in the emission treatment system contains a platinum group component (e.g., platinum, palladium or rhodium components) dispersed on a high surface area, refractory oxide support (e.g., γ-alumina). A suitable platinum group metal component is platinum.

Platinum group metal-based compositions suitable for use in forming the oxidation catalyst are also described in U.S. Pat. No. 5,100,632 (the '632 patent) hereby incorporated by reference. The '632 patent describes compositions that have a mixture of platinum, palladium, rhodium, and ruthenium and an alkaline earth metal oxide such as magnesium oxide, calcium oxide, strontium oxide, or barium oxide with an atomic ratio between the platinum group metal and the alkaline earth metal of about 1:250 to about 1:1, and preferably about 1:60 to about 1:6.

Catalyst compositions suitable for the oxidation catalyst may also be formed using base metals as catalytic agents. For example, U.S. Pat. No. 5,491,120 (the disclosure of which is hereby incorporated by reference) discloses oxidation catalyst compositions that include a catalytic material having a BET surface area of at least about 10 $m^2$/g and consist essentially of a bulk second metal oxide which may be one or more of titania, zirconia, ceria-zirconia, silica, alumina-silica, and α-alumina.

Also useful are the catalyst compositions disclosed in U.S. Pat. No. 5,462,907 (the '907 patent, the disclosure of which is hereby incorporated by reference). The '907 patent teaches compositions that include a catalytic material containing ceria and alumina each having a surface area of at least about 10 $m^2$/g, for example, ceria and activated alumina in a weight ratio of from about 1.5:1 to 1:1.5. Alternatively, palladium in any desired amount may be included in the catalytic material. Additional useful compositions are disclosed in U.S. Pat. No. 7,078,074, the entire content of which is incorporated herein by reference.

The PGM loading on the inlet zone can be varied to between about 20 g/$ft^3$ and 200 g/$ft^3$, more specifically between about 30 g/$ft^3$ and 150 g/$ft^3$, and in a specific embodiment between about 40 g/$ft^3$ and 100 g/$ft^3$. These amounts can be incrementally varied in amounts of 5 g/$ft^3$ between these ranges. In specific embodiments, the PGM is can be chosen from Pt and/or Pd, both of which are good oxidation catalysts for hydrocarbons. The current price of platinum is much higher than for palladium, thus the latter offers the advantage of reduced cost; however, this may change in the future depending on PGM demand. Platinum is very active for hydrocarbon oxidation reactions and is rather resistant to poisoning. Palladium can be less active and is susceptible to poisoning, e.g. by sulfur. However, under lean exhaust conditions and temperatures that might exceed 800° C., platinum can experience thermal sintering and thereby reduction in oxidation activity. Addition of palladium and its interaction with the platinum results in a substantial reduction in the high temperature sintering of the platinum and thereby maintenance of its oxidation activity. If the temperatures of exposure are kept low, Pt-only may be a good option to obtain the highest possible oxidation activity. However, in configurations in which high temperatures (e.g. 800° C.) are anticipated, especially internal to the filter, inclusion of some Pd is desired. Pt:Pd ratios to obtain acceptable Pt stability with the highest oxidation activity are between about 10:1 and 4:1; however, ratios as low as 2:1 and 1:1 are also within the scope of the invention. Higher Pd contents (e.g., 1:2) are also within the scope of the present invention. In certain embodiments, Pd with no platinum may be used.

The PGM is dispersed on a suitable support material such as a refractory oxide with high surface area and good thermal stability such as a high surface area aluminum oxide. High surface area aluminas are suitable supports for PGM and SBa-150 (Sasol North America) with surface area of 138-158 $m^2$/g and pore volume of 0.44-0.55 $cm^3$/g ($N_2$) is an example of a suitable alumina support. Also aluminas stabilized with a second oxide are suitable supports. Lanthana stabilization of alumina provides a suitable support for PGM. For example GA-200L (4 wt. % $La_2O_3$) stabilized alumina (Engelhard, Port Allen, La.) with surface area of 190-250 $m^2$/g and pore volume of 0.5 $cm^3$/g ($N_2$) is a suitable stabilized alumina. Also mixtures of aluminas are suitable supports, for example 50:50 wt. SBa-150 plus GA-200L. Other aluminas that are doped or treated with oxides such as $SiO_2$, $ZrO_2$, $TiO_2$, etc.) to provide stabilization or improved surface chemistries can also be utilized. Other suitable support materials, include, but are not limited to $ZrO_2$ and $TiO_2$ can be used. In addition to the PGM support oxides discussed above it might prove useful to include other catalytically functional oxides to incorporate into the catalytic zone. Examples of these include $CeO_2$, $Pr_6O_{11}$, $V_2O_5$, and $MnO_2$ and combinations thereof and solid solution oxide mixtures, etc. These oxides can contribute to burning of hydrocarbons, especially heavy fuel derived hydrocarbons, and deposited coke/soot derived from disproportination (i.e., dehydrogenation or oxidative dehydrogenation) of the injected fuel and in this way give additional combustion activity to the catalytic zone, plus prevent deactivation of the PGM by the deposition hydrocarbon derived coke.

The loading of the oxidation catalyst in the zone on the filter substrate is typically limited to control the contribution of the physical volume of the catalyst coating filling the pore volume of the filter substrate and thereby adversely affecting the flow resistance through the filter wall and thus the backpressure. On the other hand, with high loadings of PGM on the support oxide we have to provide sufficient surface area for good PGM dispersion. As an example, a PGM loading on the inlet zone of about 60 g/$ft^3$, a dry gain (DG) of 0.5 g/$in^3$ in the zone is acceptable. The DG can be adjusted taking into consideration the optimum PGM loading, alumina to other (denser) oxide weight ratio, and other factors.

The ratio of the zone length/volume to total filter length/volume can vary between about 0.20 to 0.9, for example, this value can be 0.25, 0.5 or 0.75. Thus for example, an 11.25" diameter×14.0" long filter substrate a zone length/depth of ca. 3.0" could be used or a ratio of 0.21 of total length/volume of the filter. However, determination of the most effective zone length/volume ratio will be part of catalyzed filter optimization for a particular exhaust emission control system design.

The inlet catalytic zone (length/volume ratio can vary) for light-off and combustion of the injected fuel. The non-zoned portion of the filter can be blank and uncatalyzed or catalyzed. This is accomplished by application of a coating to the full length of the filter substrate. This can be done prior to the application of oxidation catalyst zone coating, but this is not necessary and the main body coat can be applied after the zone coat. The main body coat will typically (but not necessarily) have a lower PGM loading and slurry washcoat DG than the inlet zone coat. The lower PGM affords lower cost and the lower DG affords lower pressure-drop across the filter. It is possible to apply this coating as a separate, outlet zone coat. This can be accomplished by applying the inlet fuel combustion zone coat to the desired length/depth to one end of the filter substrate and then applying the outlet coat to the opposite end of the substrate to the desired length/depth. This catalyst coating is applied into the pore structure of the filter wall and does not occur as a discrete coating on the filter wall. The composition of the main body or outlet zone coating can be varied. Typically, the catalytic coating is comprised of PGM on alumina(s). An example catalyst has a coating comprised of 10 g/ft$^3$ Pt—Pd (10:1 ratio) supported on [SBa-150+GA-200L aluminas (50:50 wt ratio) and applied to the full length of the filter support at a DG=0.25 g/in$^3$. The main body coating contributes to further combustion of any injected fuel that is not completely combusted on the inlet zone coat. This ensures that all the hydrocarbon and any possible partial oxidation products such as carbon monoxide are fully oxidized before they exit the filter.

NOx Reducing Catalysts

For most US heavy duty diesel applications starting in 2007 engine design and calibration will be sufficient to meet the NOx standard. However, in the United States, particularly starting in 2010, stricter NOx emissions standards are not expected to be met by engine design and calibration measures alone and a NOx reduction after treatment catalyst will be required. The NOx reducing catalyst according to one or more embodiments of the invention can comprise a selective catalytic reduction (SCR) catalyst, a lean NOx catalyst, a lean NOx trap (LNT), or a combination of these. This could also be applied to light duty diesel applications.

It should be noted that the engine-out NOx is mainly in the form of NO with low levels of NO$_2$ and that the PGM loadings and ratios employed in the zone and body of the zoned particulate filter can be tailored to control the level of filter-out NO$_2$ versus NO. The oxidation reaction, represented by NO+½O$_2$→NO$_2$, can be controlled by the PGM function. The effectiveness of the down-stream SCR or LNT can be enhanced by control of the NO$_2$/NO ratio.

For an SCR reaction, there are three reaction conditions can be considered depending on the NO$_2$/NO ratio:

(1) Standard:

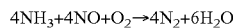

(2) "Fast":

(3) "Slow":

From the above three conditions, it can be seen that the desired "fast" or more efficient SCR reaction occurs if the NO$_2$ to NO ratio is 1:1 and relative to engine-out it is expected to require an oxidation function to increase the relative amount of NO$_2$. According to embodiments of the invention, the PGM on the zoned particulate filter can contribute to this function and tailoring the PGM loading and ratio can be used to achieve this. It is believed that the 1:1 ratio will give the best down-stream SCR reaction. Higher levels of NO$_2$ are detrimental in that it gives a slower SCR reaction. For the LNT operation, it is necessary to oxidize engine-out NO as fully as possible to NO$_2$ as LNT's absorb NOx principally as nitrates. Tailoring the zoned-CSF's PGM loading and ratio would achieve this. LNT operation would be expected to require higher loading levels of PGM with most if not all the PGM in the form of Pt.

Suitable SCR catalyst compositions for use in the system are able to effectively catalyze the reduction of the NOx component at temperatures below 600° C., so that adequate NOx levels can be treated even under conditions of low load which typically are associated with lower exhaust temperatures. Preferably, the catalyst article is capable of converting at least 50% of the NOx component to N$_2$, depending on the amount of reductant added to the system. Another desirable attribute for the composition is that it possesses the ability to catalyze the reaction of O$_2$ with any excess NH$_3$ to N$_2$ and H$_2$O, so that NH$_3$ is not emitted to the atmosphere. Useful SCR catalyst compositions used in the inventive system also have should resist degradation upon exposure to sulfur components, which are often present in diesel exhaust gas compositions.

Suitable SCR catalyst compositions are described, for instance, in U.S. Pat. No. 4,961,917 (the '917 patent) and U.S. Pat. No. 5,516,497, which are both hereby incorporated by reference in their entirety. Compositions disclosed in the '917 patent include one or both of an iron and a copper promoter present in a zeolite in an amount of from about 0.1 to 30 percent by weight, preferably from about 1 to 5 percent by weight, of the total weight of promoter plus zeolite. In addition to their ability to catalyze the reduction of NOx with NH$_3$ to N$_2$, the disclosed compositions can also promote the oxidation of excess NH$_3$ with O$_2$, especially for those compositions having higher promoter concentrations. Another suitable SCR catalyst composition comprises vanadia-titania.

Zeolites used in such compositions are resistant to sulfur poisoning, sustain a high level of activity for the SCR process. These zeolites have a pore size large enough to permit adequate movement of the reactant molecules NO and NH$_3$ in to, and the product molecules N$_2$ and H$_2$O out of, the pore system in the presence of sulfur oxide molecules resulting from short term sulfur poisoning, and/or sulfate deposits resulting from long term sulfur poisoning. The pore system of suitable size is interconnected in all three crystallographic dimensions. As is well known to the those skilled in the zeolite art, the crystalline structure of zeolites exhibits a complex pore structure having more or less regularly recurring connections, intersections and the like. Pores having a particular characteristic, such as a given dimension diameter or cross-sectional configuration, are said to be one dimensional if those pores do not intersect with other like pores. If the pores intersect only within a given plane with other like pores, the pores of that characteristic are said to be interconnected in two (crystallographic) dimensions. If the pores intersect with other like pores lying both in the same plane and in other planes, such like pores are said to be interconnected in three dimensions, i.e., to be "three dimensional". It has been found that zeolites which are highly resistant to sulfate poisoning and provide good activity for both the SCR process and the oxidation of ammonia with oxygen, and which retain good activity even when subject to high temperatures, hydrothermal conditions and sulfate poisons, are zeolites which have pores which exhibit a pore diameter of at least about 7 Angstroms and are interconnected in three dimensions. While embodiments of the present invention are not to be bound by any specific theory, it is believed that the interconnection of pores of at least 7 Angstroms diameter in three dimensions provides for good mobility of sulfate molecules throughout the zeolite structure, thereby permitting the sulfate molecules to be released from the catalyst to free a large number of the available adsorbent sites for reactant NOx and NH$_3$ molecules and reactant NH$_3$ and O$_2$ molecules. Any zeolites meeting the foregoing criteria are suitable for use in the practices of the present invention; specific zeolites which meet these criteria are USY, Beta and ZSM-20. Other zeolites may also satisfy the aforementioned criteria.

The NOx reducing catalyst may comprise a lean NOx catalyst. Lean NOx catalysts are typically classified as either a low temperature NOx catalyst or a high temperature NOx catalyst. The low temperature lean NOx catalyst is platinum based (Pt-based) and does not have to have a zeolite present to be active, but Pt/zeolite catalysts appear to have better selectivity against formation of $N_2O$ as a by-product than other catalysts, such as Pt/alumina catalysts. Generally, a low temperature lean NOx catalyst has catalytically active temperature ranges of about 180 to 350° C. with highest efficiencies at a temperature of about 250° C. High temperature lean NOx catalysts have base metal/zeolite compositions, for example Cu/ZSM-5. High temperature NOx catalysts have a lower temperature range of about 300-350° C. with highest efficiency occurring around 400° C. Different embodiments of the present invention use either high or low temperature lean NOx catalysts with an HC reductant.

The NOx reducing catalyst may comprise a lean NOx trap. Lean NOx traps are disclosed in U.S. Pat. Nos. 5,875,057 and 6,471,924, the entire content of each patent incorporated herein by reference. In general, a lean NOx trap containing a combination of a NOx sorbent and an oxidation catalyst, which sorbs NOx onto the trap member during selected periods of time, e.g., when the temperature of the gaseous stream is not suited for catalytic lean NOx abatement. During other periods of time, e.g., when the temperature of the gaseous stream being treated is suitable for catalytic lean NOx abatement, the combustible component on the trap is oxidized to thermally desorb the NOx from the trap member. A lean NOx trap typically comprises a catalytic metal component such as one or more platinum group metals and/or a base metal catalytic metal component such as oxides of one or more of copper, cobalt, vanadium, iron, manganese, etc.

The NOx reducing catalyst compositions can be coated onto honeycomb flow-through monolith substrates formed of refractory metallic or ceramic (e.g., cordierite) materials. Alternatively, oxidation catalysts may be formed on to metallic or ceramic foam substrates which are well-known in the art. These oxidation catalysts, by virtue of the substrate on which they are coated (e.g., open cell ceramic foam), and/or by virtue of their intrinsic oxidation catalytic activity provide some level of particulate removal.

According to one or more embodiments of the invention, a reductant dosing system is provided upstream of the NOx reducing catalyst and downstream of the particulate to inject a NOx reductant into the exhaust stream. As disclosed in U.S. Pat. No. 4,963,332, NOx upstream and downstream of the catalytic converter can be sensed, and a pulsed dosing valve can be controlled by the upstream and downstream signals. In alternative configurations, the systems disclosed in U.S. Pat. No. 5,522,218, where the pulse width of the reductant injector is controlled from maps of exhaust gas temperature and engine operating conditions such as engine rpm, transmission gear and engine speed. Reference is also made to the discussion of reductant pulse metering systems in U.S. Pat. No. 6,415,602, the discussion of which is hereby incorporated by reference.

Figure 4:
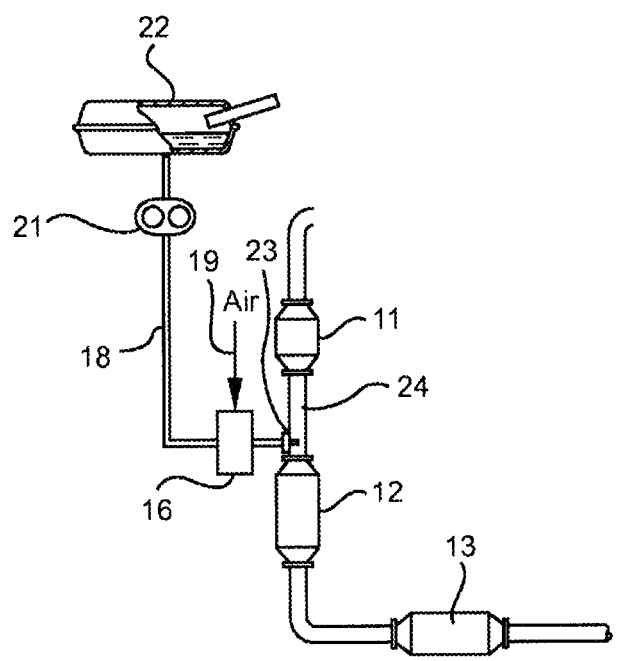
FIG. 4 shows an embodiment of a system including urea reservoir and injector.

In the embodiment of FIG. 4, an aqueous urea reservoir 22 stores a urea/water solution aboard the vehicle which is pumped through a pump 21 including a filter and pressure regulator to a urea injector 16. Urea injector 16 is a mixing chamber which receives pressure regulated air on line 19 which is pulsed by a control valve to urea injector 16. An atomized urea/water/air solution results, which is pulsed injected through a nozzle 23 into exhaust pipe 24 downstream of particulate filter 11 and upstream of the NOx reducing catalyst 12, which is upstream of optional $NH_3$ destruction catalyst 13.

This invention is not limited to the aqueous urea metering arrangement shown in FIG. 4. It is contemplated that a gaseous nitrogen based reagent will be utilized. For example, a urea or cyanuric acid prill injector can meter solid pellets of urea to a chamber heated by the exhaust gas to gasify the solid reductant (sublimation temperature range of about 300 to 400° C.). Cyanuric acid will gasify to isocyanic acid (HNCO) and urea will gasify to ammonia and HNCO. With either reductant, a hydrolysis catalyst can be provided in the chamber and a slip stream of the exhaust gas metered into the chamber (the exhaust gas contains sufficient water vapor) to hydrolyze (temperatures of about 150 to 350° C.) HNCO to produce ammonia.

In addition to urea and cyanuric acid, other nitrogen based reducing reagents or reductants especially suitable for use in the control system of the present invention includes ammelide, ammeline, ammonium cyanate, biuret, cyanuric acid, ammonium carbamate, melamine, tricyanourea, and mixtures of any number of these. However, the invention in a broader sense is not limited to nitrogen based reductants but can include any reductant containing hydrocarbons such as distillate fuels including alcohols, ethers, organo-nitro compounds and the like (e.g., methanol, ethanol, diethyl ether, etc.) and various amines and their salts (especially their carbonates), including guanidine, methyl amine carbonate, hexamethylamine, etc.

$NH_3$-Destruction Catalyst Compositions

In one or more embodiments, the $NH_3$ destruction catalyst is composed of a platinum group metal component dispersed on a refractory inorganic oxide support. When the $NH_3$ destruction catalyst is deposited on the monolith carrier, the platinum group metal component is typically present at from 0.1 to 40 g/ft$^3$, and preferably, from 0.5 to 10 g/ft$^3$. At these concentrations the platinum group metal component is effective for the oxidation of ammonia to form $N_2$, but has a diminished propensity to cause oxidation of ammonia to form NOx. As described above, higher concentrations of platinum in the composition are liable to promote the conversion of excess ammonia to NOx and not to $N_2$. Moreover, lower levels of platinum group metal components are desired to minimize the formation of sulfates that contribute to the mass of the particulate matter that is discharged to the atmosphere.

Suitable platinum group metal components include platinum, palladium, rhodium and iridium components. Platinum is especially suitable. In embodiments of the invention, where platinum is used in the $NH_3$ destruction catalyst, the platinum component can be sulfated to further moderate the catalytic activity of the platinum component and control NOx formation. The sulfation can be performed by treatment of the composition with sulfuric acid, or alternatively, by subjecting the final coated composition to an exhaust stream derived from an internal combustion engine that uses fuel that contains higher levels of sulfur component (e.g., >350 ppm). A An exemplary $NH_3$ destruction catalyst material is composed of platinum dispersed on one or both of bulk ceria and activated alumina. Such compositions are similar to those described in U.S. Pat. No. 5,462,907, the disclosure of which is hereby incorporated by reference. The catalytic material can be prepared in the form of an aqueous slurry of ceria and alumina particles, the particles being impregnated with the a water-dispersible or water-soluble platinum precursor. The slurry can then applied to the carrier, dried and calcined to form a catalytic material coating ("washcoat") thereon. Typically, the ceria and alumina particles are mixed with water and an acidifier such as acetic acid, nitric acid or sulfuric acid, and ball milled to a desired particle size. Alternatively the slurry can be dried and calcined before being coated on the carrier.

The platinum catalytic metal component is preferably incorporated into the ceria particles or into the ceria and alumina particles. The ceria-alumina acts not only as a catalyst but also as a support for the platinum catalytic metal component. Such incorporation with the platinum precursor can also be conducted after the ceria-alumina catalytic material is coated as a washcoat onto a suitable carrier, by impregnating the coated carrier with a solution of a suitable platinum precursor, followed by drying and calcination. However, preferably, the ceria particles or both the ceria and alumina particles are impregnated with a suitable platinum precursor before a coating of the ceria-alumina catalytic material is applied to the carrier. In either case, the platinum metal is added to the ceria-alumina catalytic material as, e.g., a solution of a soluble platinum compound, the solution serving to impregnate the ceria and alumina particles (or the ceria-alumina coating on the carrier), which may then be dried and the platinum fixed thereon. Fixing can be carried out by calcination or by treatment with hydrogen sulfide or by other known means, to render the metal in water-insoluble form.

Generally, the slurry of ceria and activated alumina particles, with the platinum solution, will be deposited upon the carrier substrate and dried and calcined to adhere the catalytic material to the carrier and, to revert the platinum compound to the elemental metal or its oxide. Suitable platinum precursors for use in the foregoing process include potassium platinum chloride, ammonium platinum thiocyanate, amine-solubilized platinum hydroxide and chloroplatinic acid, as is well-known in the art. During calcination, or at least during the initial phase of use of the catalyst, such compounds, if present, are converted into the catalytically active elemental platinum metal or its oxide.

When the catalytic material is applied as a thin coating to a suitable carrier, such as described above, the proportions of ingredients are conventionally expressed as weight of material per gross unit volume of catalyst, as this measure accommodates the presence of different cell densities, wall thicknesses, gas flow passages, etc. Grams per cubic inch ("$g/in^3$") units are used to express the quantity of relatively plentiful components such as the ceria-alumina catalytic material, and grams per cubic foot ("$g/ft^3$") units are used to express the quantity of the sparsely used ingredients, such as the platinum metal. For typical diesel exhaust applications, the ceria-alumina catalytic material generally may comprise from about 0.25 to about 4.0 $g/in^3$, preferably from about 0.25 to about 3.0 $g/in^3$ of the coated carrier substrate, and from about 0.1 to 10 $g/ft^3$ of platinum.

Optional Components

Generally, other ingredients may be added to the catalyst composition such as conventional thermal stabilizers for the alumina, e.g., rare earth metal oxides such as ceria. Thermal stabilization of high surface area ceria and alumina to prevent phase conversion to less catalytically effective low surface area forms is well-known in the art. Such thermal stabilizers may be incorporated into the bulk ceria or into the bulk activated alumina, by impregnating the ceria (or alumina) particles with, e.g., a solution of a soluble compound of the stabilizer metal, for example, an aluminum nitrate solution in the case of stabilizing bulk ceria. Such impregnation is then followed by drying and calcining the impregnated ceria particles to convert the aluminum nitrate impregnated therein into alumina.

In addition, the catalyst compositions may contain other catalytic ingredients such as other base metal promoters or the like. However, in one embodiment, the catalyst composition of the present invention consists essentially only of the high surface area ceria and high surface area alumina, preferably present in a weight proportion of 1.5:1 to 1:1.5, with or without thermal stabilizers impregnated therein, and, from 0.1 to 10 $g/ft^3$ of platinum.

EXAMPLES

The following examples further illustrate the present invention, but of course, should not be construed as in any way limiting its scope.

Example 1

Preparation of Zone Coated Catalyzed Particulate Filter Sample

A zoned catalyzed soot filter (CSF) consistent with this invention was prepared as follows:

A cordierite wall-flow filter substrate (Corning CO) having a round cross section with dimensions of 10.5" dia.×12.0" long and having a cell spacing of 200 cpsi with a filter wall thickness of 0.012" was used. The coating of this substrate consisted of:

a. An optional first coating of fugitive water soluble polymer, Rhoplex P-376 (Rohm & Haas) applied to the entire substrate that after drying resulted in a DG=0.25 $g/in^3$. One purpose of this polymer coating is to fill the smallest of pores in the cordierite filter porosity, thereby allowing better distribution of the subsequent catalytic coating in the wall of the filter substrate.

b. A first catalytic coating applied to the full length of the wall flow filter substrate. This coating was comprised of platinum and palladium impregnated onto a 50:50 wt mixture of lanthanum stabilized alumina, GA-200L (Engelhard), containing 4% $La_2O_3$ and alumina, SBa-150 (Sasol North America). Platinum was first impregnated onto the mixture of aluminas as an aqueous solution of monoethanol-amine stabilized Pt (IV) hydroxide and then with palladium as an aqueous solution of Pd (II) nitrate. The resulting PGM impregnated alumina mixture with Pt to Pd ratio of 10:1 was milled in water to achieve a particle size distribution with 90% less than 7 microns, following which the resultant slurry was adjusted for pH=4 and solids for coating. The first catalytic coating was applied to the full length of the wall flow filter substrate in one pass to achieve a DG=0.26 $g/in^3$ and having a total Pt+Pd loading of 10 $g/ft^3$ with a Pt to Pd ratio of 10:1.

c. A second, zone catalytic coat was then applied to the inlet end of the wall flow filter substrate to a length (depth) of 3". This coating was comprised of platinum and palladium impregnated onto a 50:50 wt. mixture of lanthanum stabilized alumina, GA-200L (Engelhard), containing 4% $La_2O_3$ and alumina, SBa-150 (Sasol North America). Platinum was first impregnated onto the mixture of aluminas as an aqueous solution of monoethanol-amine stabilized Pt (IV) hydroxide and then with palladium as an aqueous solution of Pd (II) nitrate. The resulting PGM impregnated alumina mixture with Pt to Pd ratio of 10:1 was milled in water to achieve a particle size distribution with 90% less than 7 microns, following which the resultant slurry was adjusted for pH=4 and solids for coating. The second, zone catalytic coating was applied to the inlet 3" of the wall flow filter substrate in one pass to achieve a DG=0.53 $g/in^3$ within the zone and having a total Pt+Pd loading of 60 $g/ft^3$ with a Pt to Pd ratio of 10:1.

This resulted in a zoned catalyzed soot filter (CSF) having an overall total Pt+Pd loading level of 25.0 $g/ft^3$ with overall Pt to Pd ratio of 10:1.

Example 2

Fuel Light-Off Over Zoned CSF

In order to demonstrate active regeneration capability of the zoned CSF a fuel light-off test in the engine test cell was conducted. This testing was run using a turbocharged 7.6 liter, 225 HP diesel engine installed in an engine test cell and connected to a dynamometer. The testing was conducted using the zoned catalyzed soot filter (CSF) described in Example 1, above.

For the light-off testing the zoned catalyzed soot filter (CSF) was mounted in the exhaust line of the engine in a position 10 ft. down stream of the engine's turbocharger. The exhaust line was equipped with a fuel injector through which supplemental diesel fuel could be introduced into the exhaust stream. This fuel injector was a standard type used for gasoline engines and it was mounted just down stream of the engine's turbocharger. Between the diesel fuel injector and the zoned catalyzed soot filter (CSF) was mounted an inline mixer to assist mixing of the atomized, injected fuel with the exhaust stream. All tests were conducted using ultra low sulfur (<15 ppm S) diesel fuel both for engine operation and supplemental fuel injected into the exhaust.

For the test the engine was operated at a speed of 1570 rpm and a torque of 745 Nm which resulted in a total exhaust flow of 740 std. $m^3$/hr with an exhaust temperature at the inlet of the zoned catalyzed soot filter (CSF) of 300° C. as measured by a thermocouple mounted just up stream of the face of the CSF. A thermocouple was also mounted just down stream of the CSF outlet face to measure the exhaust temperature at that location.

Figure 5:
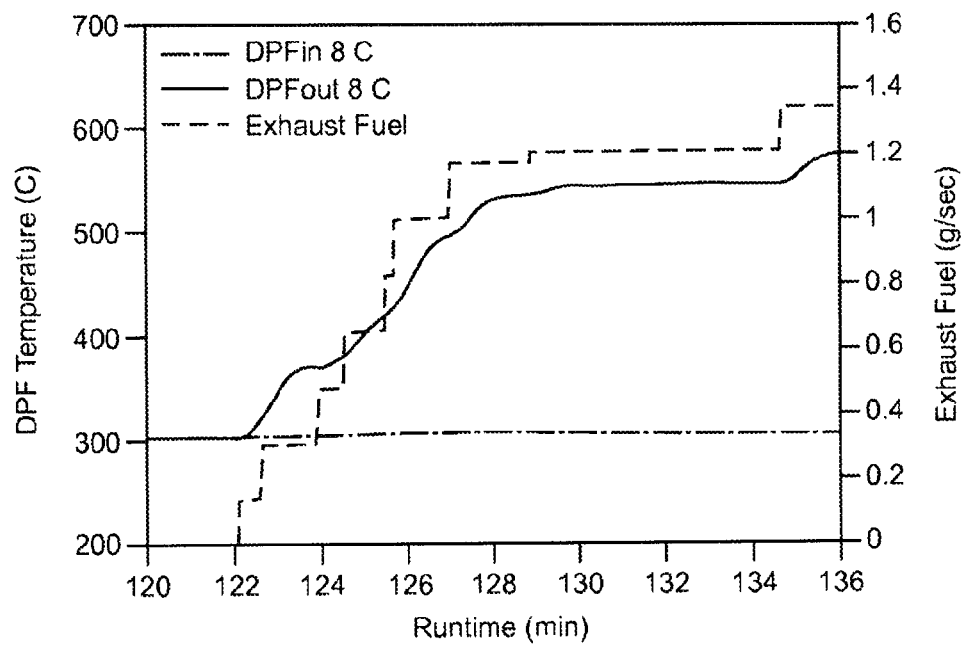
FIG. 5 is a graph showing particulate filter out exhaust gas temperature as a function of test run time with supplemental diesel fuel injected into the exhaust up stream of the particulate filter.

Starting with a relatively clean, soot free zoned catalyzed soot filter (CSF) the system was allowed to equilibrate and stabilize for temperature. Following this (ca. 122 minutes runtime) diesel fuel was introduced at varying levels into the exhaust via the fuel injector described above and the exhaust temperatures at the inlet and outlet of the CSF were monitored. The results are shown in FIG. 5. Initially the CSF in and CSF out exhaust temperatures were the same (300° C.), but as increasing amounts of fuel were injected into the up stream exhaust the CSF outlet temperature increased. For one segment (ca. 130-135 minutes runtime) with 1.2 g/sec diesel fuel injected into the exhaust the CSF outlet exhaust gas temperature was 545° C. which was an increase of 245° C. above the inlet exhaust gas temperature. This exhaust temperature is in the range sufficient to give soot combustion in the filter under active regeneration conditions. Measurement of the exhaust gas total hydrocarbon content during this segment showed ca. 13,000 ppm C1 at the CSF inlet location, but only 2.7 ppm C1 at the CSF outlet indicating essentially complete combustion of the supplemental injected diesel fuel in the CSF.

Figure 6:
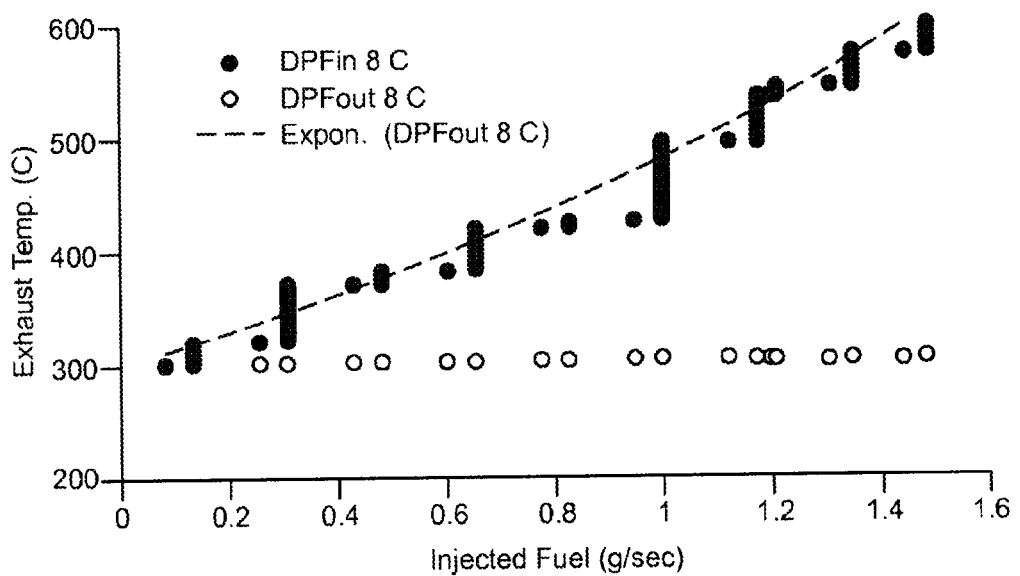
FIG. 6 is a graph showing particulate filter out exhaust gas temperature as a function of supplemental diesel fuel injected into the exhaust up stream of the particulate filter.

FIG. 6 shows the inlet vs. outlet exhaust temperature data for the light-off test above as a function of the rate of injection of diesel fuel into the exhaust up stream of the zoned catalyzed soot filter (CSF). This shows a regular increase in CSF out exhaust temperature with increase in injected diesel fuel and that temperatures of 600° C. can be attained for injection rates of 1.5 g/sec. At some injection rate levels the exhaust temperature data appears as bar or range which reflects the temperature-time heat up response on changing from one injection rate to the next higher one.

Example 3

Fuel Light-Off Testing with Temperature Measurements in the Zoned Catalyzed Soot Filter (CSF) Bed The test in EXAMPLE 2 above measured the effect of light-off of injected fuel on exhaust gas temperatures under one engine speed and load condition. CSF out exhaust temperatures as high as 600° C. were attained which are in a good range for achieving reasonably rapid combustion of soot in the CSF for active regeneration.

The test of EXAMPLE 3 extended investigation to include measurement of temperatures within the zoned catalyzed filter. These measurements allowed characterization of both axial and radial distribution of temperatures within the CSF to demonstrate how the light-off of injected fuel developed and its uniformity. Further, the temperatures within the CSF were more representative of local temperatures in the same regions where the soot combustion was taking place during active regeneration.

In addition the tests of EXAMPLE 3 were conducted at different engine speeds that gave different exhaust flows, plus different torque levels were employed at these speeds to give lower CSF inlet exhaust temperatures than were run for EXAMPLE 2.

Figure 7:
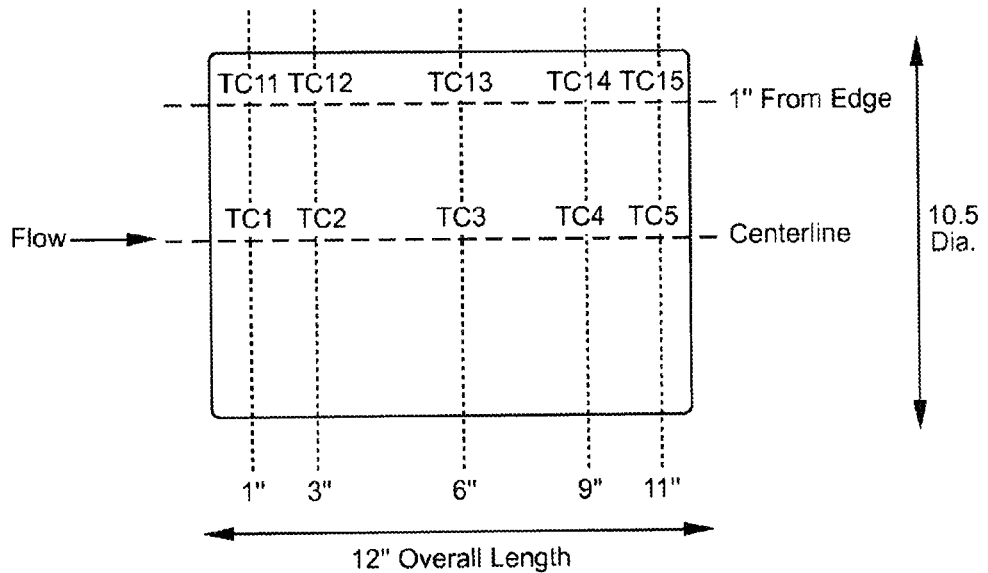
FIG. 7 is a diagram showing the location of thermocouples installed within the particulate filter substrate for measurement of internal temperatures.

For these tests the same engine and test set up were used as in EXAMPLE 2, except that the zoned catalyzed soot filter (CSF) was fitted with internal thermocouples to measure the internal filter temperatures. Ten (10) thermocouples were installed in the filter in a configuration shown in FIG. 7. This configuration consisted of five (5) thermocouples installed down the centerline of the filter to measure the temperatures in the very middle of the filter body. These thermocouples were positioned at 1" from the inlet face (TC1), 3" from the inlet face and at the rear of the inlet zone (TC2), 6" from the inlet face and at the filter axial mid-point (TC3), 9" from the inlet face (TC4) and 11" from the inlet face (TC5). In addition five (5) thermocouples were installed in a line that was located 1" radially from the outer edge of the zoned catalyzed soot filter and were at corresponding positions from the inlet face of the filter of 1" (TC11), 3" (TC12), 6" (TC13), 9" (TC14) and 11" (TC15).

The thermocouples used in EXAMPLE 2 to measure exhaust gas temperatures near the inlet and outlet faces of the CSF were also in place for exhaust gas temperature measurement in this test.

The testing consisted of running light-off tests with injected fuel at three characteristic engine speeds: A-speed=1580 rpm, B-speed=1940 rpm and C-speed=2680 rpm. The injected fuel rate was held constant at each speed condition and the engine torque was varied to give different inlet exhaust gas temperatures between 350° C. and 250° C. Stabilized temperatures were recorded for inlet and outlet exhaust gas and for the internal thermocouples installed in the CSF.

The results for the A-speed tests are given in TABLE I, below:

TABLE I

A-Speed Data for Fuel Light-Off
A-Speed = 1580 rpm
Fuel Injection Rate = 1.66 g/sec

| | Test Point | | | |
|---|---|---|---|---|
| | 1 | 2 | 3 | 4 |
| Exhaust Flow (std. m3/hr) | 739 | 720 | 700 | 682 |
| Zoned CSF-In Gas Temp. (C.) | 305 | 285 | 268 | 256 |
| Zoned CSF-Out Gas Temp. (C.) | 658 | 629 | 604 | 607 |
| Filter Internal Temperatures: | | | | |
| TC1 Centerline 1" in Temp. (C.) | 498 | 454 | 433 | 419 |
| TC2 Centerline 3" in Temp. (C.) | 537 | 499 | 470 | 465 |
| TC3 Centerline 6" in Temp. (C.) | 599 | 565 | 533 | 532 |

TABLE I-continued

A-Speed Data for Fuel Light-Off
A-Speed = 1580 rpm
Fuel Injection Rate = 1.66 g/sec

| | Test Point | | | |
|---|---|---|---|---|
| | 1 | 2 | 3 | 4 |
| TC4 Centerline 9" in Temp. (C.) | 663 | 634 | 604 | 608 |
| TC5 Centerline 11" in Temp. (C.) | 700 | 669 | 635 | 641 |
| TC11 Edge 1" in Temp. (C.) | 489 | 446 | 408 | 351 |
| TC12 Edge 3" in Temp. (C.) | 528 | 488 | 465 | 455 |
| TC13 Edge 6" in Temp. (C.) | 598 | 565 | 533 | 531 |
| TC14 Edge 9" in Temp. (C.) | 653 | 615 | 589 | 592 |
| TC15 Edge 11" in Temp. (C.) | 700 | 669 | 635 | 641 |

With a diesel fuel injection rate of 1.66 g/sec and for inlet exhaust temperatures in the range of 305° C. to 256° C. and exhaust flows in the range of 739-682 std. m³/hr it was possible to achieve CSF outlet exhaust temperatures in the range of 658° C. to 607° C. which give a good range for reasonably rapid soot combustion in a filter.

Furthermore, high internal temperatures >500° C. within the filter could be attained over much of the length of the filter which are sufficient to give reasonably rapid soot combustion from the filter. The internal temperatures down the centerline of the filter and 1" from the outer edge of the filter showed good radial uniformity of temperature in the filter during the light-off test. The internal temperatures measured at the position 1" in from the inlet face of the filter were lower than those measured further in from the inlet face, but this is understandable in that light-off of the injected fuel was being initiated in this region. Still the internal temperatures 1" in from the inlet face of the CSF were 163° C. to 193° C. higher than the inlet exhaust gas temperature.

Figure 8:
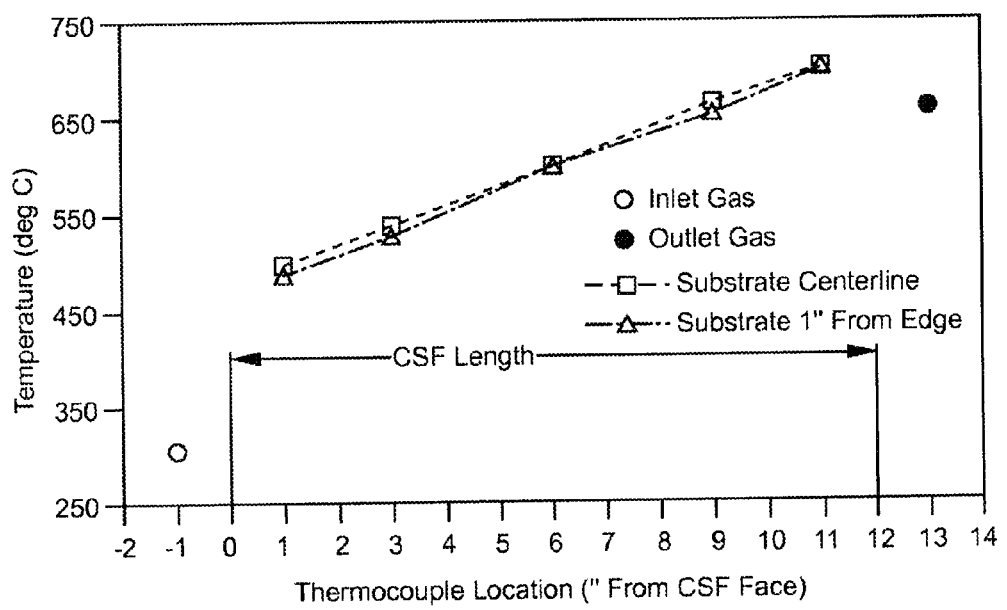
FIG. 8 is a graph showing internal particulate filter temperatures as a function of location in the particulate filter, plus inlet and outlet exhaust gas temperatures, during a fuel light-off test.

The exhaust gas and internal substrate temperatures for A-speed test point 1 (305° C. inlet gas temperature) are shown graphically in FIG. 8. It can be seen that there was essentially a linear increase in internal substrate temperature down the length of the CSF with temperatures >500° C. over most of the length of the CSF to facilitate reasonably rapid soot combustion in the filter for active regeneration. Furthermore, the CSF internal temperatures at the centerline of the filter and 1" from the outer edge of the filter were nearly identical which showed good uniformity of light-off and active fuel burning.

The results for the B-speed tests are given in TABLE II, Below:

TABLE II

B-Speed Data for Fuel Light-Off
B-Speed = 1940 rpm
Fuel Injection Rate = 2.25 g/sec

| | Test Point | | | |
|---|---|---|---|---|
| | 1 | 2 | 3 | 4 |
| Exhaust Flow (std. m3/hr) | 979 | 968 | 935 | 928 |
| Zoned CSF-In Gas Temp. (C.) | 294 | 281 | 271 | 261 |
| Zoned CSF-Out Gas Temp. (C.) | 646 | 652 | 657 | 656 |
| Filter Internal Temperatures: | | | | |
| TC1 Centerline 1" in Temp. (C.) | 463 | 458 | 447 | 431 |
| TC2 Centerline 3" in Temp. (C.) | 498 | 497 | 489 | 482 |
| TC3 Centerline 6" in Temp. (C.) | 551 | 560 | 556 | 556 |
| TC4 Centerline 9" in Temp. (C.) | 631 | 645 | 645 | 638 |
| TC5 Centerline 11" in Temp. (C.) | 679 | 696 | 698 | 698 |
| TC11 Edge 1" in Temp. (C.) | 447 | 423 | 375 | 326 |
| TC12 Edge 3" in Temp. (C.) | 491 | 490 | 480 | 467 |
| TC13 Edge 6" in Temp. (C.) | 550 | 557 | 549 | 543 |
| TC14 Edge 9" in Temp. (C.) | 610 | 621 | 621 | 616 |
| TC15 Edge 11" in Temp. (C.) | 673 | 691 | 691 | 691 |

These results were similar but for a higher exhaust volumetric flow condition and thus shorter contact time than for the A-speed tests. CSF outlet exhaust gas temperatures and internal filter temperatures in the range of 500° C. to ca. 700° C. should were attained which would give reasonably rapid combustion of soot from the filter under these active regeneration conditions.

The results from the C-speed tests are given in TABLE III, below:

TABLE III

C-Speed Data for Fuel Liqht-Off
C-Speed = 2680 rpm
Fuel Injection Rate = 1.80 g/sec

| | Test Point | | | | | | |
|---|---|---|---|---|---|---|---|
| | 1 | 2 | 3 | 4 | 5 | 6 | 7 |
| Exhaust Flow (std. m3/hr) | 969 | 917 | 874 | 830 | 770 | 723 | 713 |
| Zoned CSF-In Gas Temp. (C.) | 351 | 330 | 317 | 301 | 281 | 262 | 251 |
| Zoned CSF-Out Gas Temp. (C.) | 645 | 650 | 651 | 651 | 659 | 668 | 678 |
| Filter Internal Temperatures: | | | | | | | |
| TC1 Centerline 1" in Temp. (C.) | 515 | 503 | 499 | 492 | 479 | 460 | 448 |
| TC2 Centerline 3" in Temp. (C.) | 546 | 535 | 531 | 527 | 524 | 505 | 511 |
| TC3 Centerline 6" in Temp. (C.) | 590 | 584 | 582 | 581 | 585 | 586 | 587 |
| TC4 Centerline 9" in Temp. (C.) | 649 | 650 | 651 | 653 | 665 | 670 | 685 |
| TC5 Centerline 11" in Temp. (C.) | 679 | 685 | 686 | 689 | 702 | 712 | 730 |
| TC11 Edge 1" in Temp. (C.) | 513 | 503 | 498 | 491 | 478 | 457 | 446 |
| TC12 Edge 3" in Temp. (C.) | 540 | 532 | 527 | 525 | 519 | 504 | 503 |
| TC13 Edge 6" in Temp. (C.) | 587 | 582 | 579 | 578 | 584 | 586 | 587 |
| TC14 Edge 9" in Temp. (C.) | 634 | 633 | 633 | 634 | 648 | 653 | 665 |
| TC15 Edge 11" in Temp. (C.) | 673 | 678 | 682 | 682 | 697 | 712 | 730 |

The results for these tests were similar and showed good light-off of injected fuel that gave high enough CSF outlet gas temperatures and internal filter temperatures to give reasonably rapid soot combustion from the filter under active regeneration.

Example 4

Effect of Diesel Particulate (Soot) Accumulation on Zoned CSF Out $NO_2/NOx$ Ratio for Downstream SCR A zoned catalyzed soot filter (CSF) mounted up stream in the exhaust of a NOx reduction catalyst function (e.g. SCR) plays a role of removing soot and converting hydrocarbons from the exhaust which could have an effect on interfering with the catalytic sites on the SCR catalyst for the NOx reduction reaction. In addition, the CSF can act to oxidize engine out NO to $NO_2$ which can be advantageous in promoting the so called "fast" SCR reaction discussed above. This reaction requires an NO to $NO_2$ ratio of 1:1 or an $NO_2$ to total NOx ratio of 0.50 to get the best results. Thus it was important to evaluate the performance of the zoned CSF with respect to its outlet $NO_2/NOx$ ratio. Furthermore, the $NO_2$ produced in the CSF can react with soot in the CSF and it was important to determine the CSF out $NO_2/NOx$ ratio with the accumulation of soot in the filter.

Figure 9:
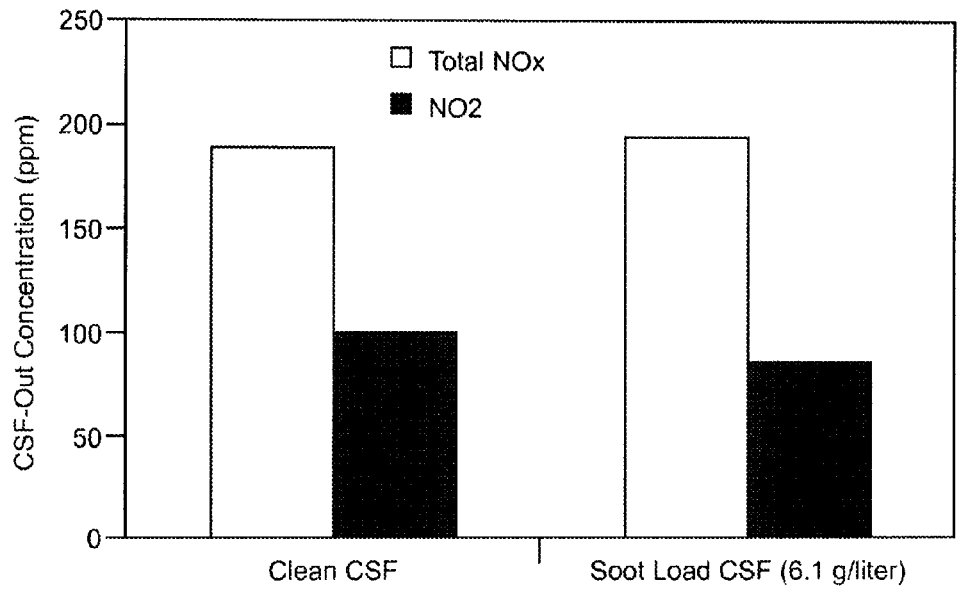
FIG. 9 is a graph showing particulate filter out total NOx and $NO_2$ concentrations measured by FTIR for "clean" soot free and soot loaded conditions.

This was done using the same zoned catalyzed soot filter (CSF) from EXAMPLES 1-3 above. The zoned CSF was actively regenerated as above and subsequently burned free of residual soot in a furnace at 600° C. in air to achieve a "clean" filter and obtain a "clean" tare filter weight. The "clean" CSF was mounted in the exhaust stream of a 6.6 liter 330 HP engine and equipped with an FTIR with sampling point down stream of the CSF to measure total NOx and $NO_2$ levels in the exhaust stream. The engine was run at a speed of 3200 rpm and torque of 125 Nm with a CSF in exhaust temperature of ca. 260° C. and an engine out particulate emission level which resulted in accumulation of 6.1 g/liter particulate (soot) in the zoned CSF over the period of 3 hrs. The CSF out total NOx and $NO_2$ levels measured by FTIR exhibited little change from the start of the run ("clean" CSF) to the end of the run (Soot Loaded CSF) as shown in FIG. 9. Further, the $NO_2/NOx$ ratio over the run was 0.52 at the beginning and 0.44 at the end which was in the range of the desired ratio for down stream "fast" SCR reaction and showed that accumulation of soot in the filter had little effect on the CSF out $NO_2/NOx$ ratio. This is considered to be the result of having the catalyst coatings in the zoned CSF deposited within the filter wall and thereby down stream of the accumulating soot cake in the filter.

Example 5

Figure 10:
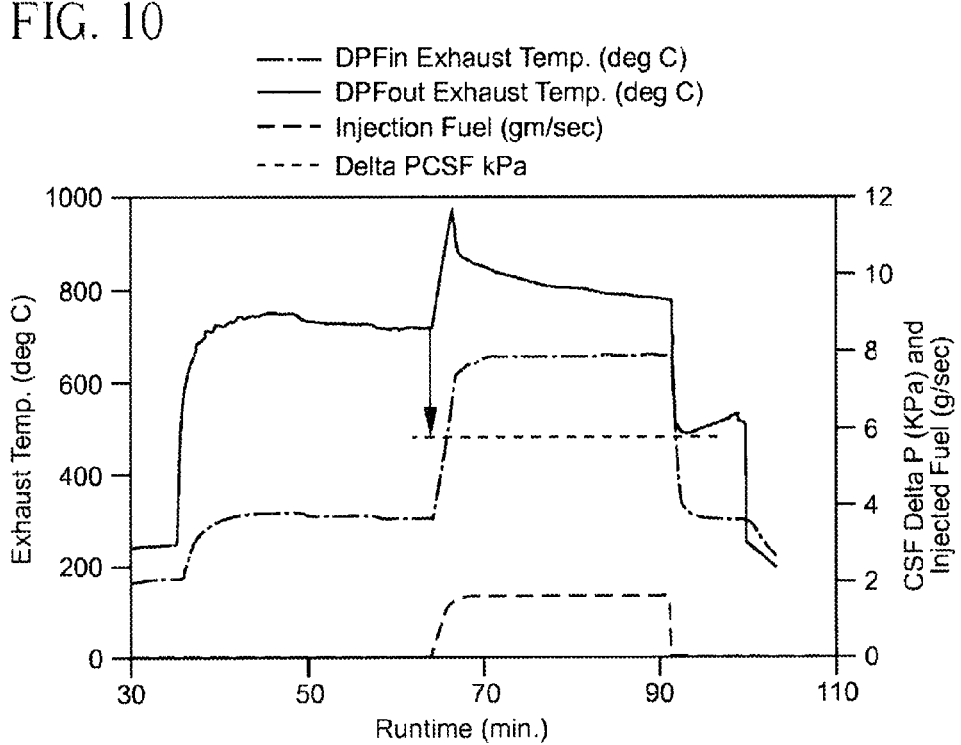
FIG. 10 is a graph showing exhaust temperatures and Delta P across a particulate filter during an active regeneration test with soot loaded in the particulate filter.

Active Regeneration of Zoned Catalyzed Soot Filter with Soot Loading in the Filter The same zoned catalyzed soot filter (CSF) used for testing in EXAMPLES 1-4 was loaded with soot on a 6.6 liter 330 HP engine at a speed of 3200 rpm and torque of 125 Nm. The soot loaded filter (2.8 g/liter soot) was placed in the exhaust line of the 7.6 liter 225 HP engine employed in EXAMPLES 2-3 and which was equipped with the same supplemental diesel fuel injector used for active regeneration. The engine was adjusted to a speed of 1566 rpm and torque of 680 Nm to achieve a CSF inlet exhaust gas temperature of 303° C. with exhaust flow of 705 std. $m^3$/hr. Once stabilized the pressure drop (Delta P) across the filter under these conditions was measured as 8.57 KPa. Supplemental diesel fuel injection into the exhaust (1.62 g/sec) was established to initiate an active regeneration which was continued for ca. 25 min. The results of this active regeneration are shown in FIG. 10. It can be seen that the CSF out exhaust gas temperature increased with supplemental fuel injection to a level of 656° C. suitable for active soot combustion. The level of Delta P also increased with increase in exhaust temperature but reached a peak of ca. 11.5 KPa after ca. 2 min. of runtime, following which Delta P was reduced and at the end of the run was ca. 9.3 KPa with outlet exhaust temperature at 656° C. for a reduction of 2.2 KPa from peak Delta P. The supplemental fuel injection was then terminated and the CSF out exhaust gas temperature returned to the same level as the CSF in exhaust gas temperature (303° C.). The level of Delta P across the filter at this point was measured as 5.87 KPa for a reduction of 2.70 KPa relative to the level before the active regeneration. Weighing of the filter after the active regeneration showed a 60% reduction in the level of soot in the filter. This was not considered to be an optimized process or test, but it clearly demonstrated active regeneration with the zoned catalyzed filter (CSF) for reduction of filter Delta P and soot loading.

While the foregoing is directed to embodiments of the present invention, other and further embodiments of the invention may be devised without departing from the basic scope thereof, and the scope thereof is determined by the claims that follow.

What is claimed is:

1. An emission treatment system for treatment of an exhaust stream
   comprising $NO_x$ and particulate matter, the emission treatment system comprising:
   a filter comprising a substrate having a plurality of passages and elements for trapping particulate contained in an exhaust stream flowing through the filter, the substrate having an inlet end and an outlet end defining an axial length, the inlet end of the substrate having a quantity of platinum group metal composition comprising platinum and palladium disposed thereon and extending for less than 50% of the axial length to periodically light off fuel at a temperature of less than about 300° C. and to produce an exotherm sufficient to burn off trapped particulate in the filter, wherein active regeneration of the filter can be accomplished by the filter alone, without a separate upstream, light-off oxidation catalyst; and
   a NOx reducing catalyst located downstream from the particulate filter.

2. The emission treatment system of claim 1, wherein the platinum group metal is present in a loading amount of at least about 30 g/ft³ and extends for less than about 50% of the axial length of the filter.

3. The emission treatment system of claim 1, wherein the platinum group metal is present in a loading amount of at least about 40 g/ft³ and extends for less than about 50% of the axial length of the filter.

4. The emission treatment system of claim 1, wherein the catalytic composition comprises platinum and palladium in a ratio of Pt:Pd of from 10:1 to 1:2.

5. The emission treatment system of claim 1, wherein the platinum group metal is present in a loading amount of at least about 20 g/ft³ and extends for less than about 50% of the axial length of the filter.

6. The emission treatment system of claim 5, wherein the substrate is in the form of a wall flow monolith having a plurality of longitudinally extending passages bounded by longitudinally extending walls, the passages comprising inlet passages having an open inlet end and a closed outlet end, and outlet passages having a closed inlet end and an open outlet end, the walls having a porosity of at least 40% with an average pore size of at least 5 microns and platinum group metal composition permeating the walls and extending from the inlet end towards the outlet end to a length that is less than the axial length of the walls to provide an inlet zone.

7. The emission treatment system of claim 6, wherein the longitudinally extending walls have a catalytic coating thereon underlying the platinum group metal composition, the catalytic coating extending the entire axial length of the filter.

8. The emission treatment system of claim 7, wherein the catalytic composition comprises a base metal oxide.

9. An emission treatment system for treatment of an exhaust stream comprising $NO_x$ and particulate matter, the emission treatment system comprising:
a particulate filter having an axial length and elements for trapping particulate matter contained in an exhaust stream flowing through the filter and a light-off oxidation catalyst composition comprising platinum and palladium extending from the inlet end towards the outlet end to a length that is less than the axial length of the walls to provide an inlet zone in an amount sufficient to periodically light-off fuel at less than about 300° C. and generate an exotherm to burn soot trapped in the filter, wherein active regeneration of the filter can be accomplished by the filter alone, without a separate upstream, light-off oxidation catalyst; and
a NOx reducing catalyst located downstream from the particulate filter.

10. The emission treatment system of claim 9, wherein the particulate filter comprises a wall flow monolith disposed within the exhaust stream and having a plurality of longitudinally extending passages bounded by longitudinally extending walls, the passages comprising inlet passages having an open inlet end and a closed outlet end, and outlet passages having a closed inlet end and an open outlet end, the walls having a porosity of at least 40% with an average pore size of at least 5 microns and the wall flow monolith comprising a light-off oxidation catalyst composition permeating the walls.

11. The emission treatment system of claim 10, further comprising an $NH_3$ destruction catalyst located downstream from the $NO_x$ reducing catalyst.

12. The emission treatment system of claim 10, wherein the $NO_x$ reducing catalyst comprises a lean $NO_x$ catalyst.

13. The emission treatment system of claim 12, further comprising a reductant introduction port in fluid communication with a hydrocarbon reductant, the reductant introduction port located upstream from the lean NOx catalyst.

14. The emission treatment system of claim 12, wherein the $NO_x$ reducing catalyst comprises a lean NOx trap.

15. The emission treatment system of claim 12, wherein the $NO_x$ reducing catalyst comprises an SCR catalyst.

16. The emission treatment system of claim 15, further comprising an introduction port located upstream from the SCR catalyst, the introduction port in fluid communication with an ammonia source or ammonia precursor.

17. The emission treatment system of claim 16, further comprising an injector in fluid communication with the introduction port, the injector configured to periodically meter the ammonia or an ammonia precursor into the exhaust stream.

18. The emission treatment system of claim 17, further comprising an $NH_3$ destruction catalyst located downstream from the SCR catalyst.

19. The emission treatment system of claim 10, further comprising an exotherm-producing agent introduction port located upstream of the wall flow monolith, the exotherm-producing agent introduction port in fluid communication with an exotherm-producing agent capable of generating a temperature sufficient to periodically burn particulate accumulated in the wall-flow monolith.

20. The emission treatment system of claim 19, wherein the exotherm-producing agent comprises diesel fuel.

21. The emission treatment system of claim 9, the oxidation catalyst comprising platinum and palladium.

22. The emission treatment system of claim 21, the platinum and palladium are present in a ratio being in the range of about 10:1 and 1:2.

23. An emission treatment system for treatment of an exhaust stream comprising $NO_x$ and particulate matter, the emission treatment system comprising:
a filter comprising a wall flow monolith disposed within the exhaust stream and having a plurality of longitudinally extending passages bounded by longitudinally extending walls, the passages comprising inlet passages having an open inlet end and a closed outlet end, and outlet passages having a closed inlet end and an open outlet end, the walls having a porosity of at least 40% with an average pore size of at least 5 microns and the wall flow monolith comprising a quantity of a light-off oxidation catalyst composition comprising platinum and palladium permeating the walls and extending from the inlet end towards the outlet end to a length that is less than the axial length of the walls to provide an inlet zone in an amount sufficient to periodically light-off fuel at less than about 300° C. and generate an exotherm to burn soot trapped in the filter, wherein active regeneration of the filter can be accomplished by the filter alone, without a separate upstream, light-off oxidation catalyst;
an SCR catalyst located downstream from the wall flow monolith; and
an injector for injecting ammonia or ammonia precursor into the exhaust gas stream upstream of the SCR catalyst.

24. The emission treatment system of claim 23, further comprising an $NH_3$ destruction catalyst located downstream from the SCR catalyst.

25. The emission treatment system of claim 24, comprising an exotherm-producing agent injector located upstream of the wall-flow monolith.

26. The emission treatment system of claim 23, wherein the light-off oxidation catalyst comprises platinum and palladium.

27. The emission treatment system of claim 26, the platinum and palladium are present in a ratio being in the range of about 10:1 and 1:2.

28. A method of treating exhaust stream from a diesel engine comprising:
disposing within the exhaust stream containing particulate matter a wall flow monolith and having a plurality of longitudinally extending passages bounded by longitudinally extending walls, the passages comprising inlet passages having an open inlet end and a closed outlet end, and outlet passages having a closed inlet end and an open outlet end, the walls having a porosity of at least 40% with an average pore size of at least 5 microns and the wall flow monolith comprising a light-off oxidation catalyst composition comprising platinum and palladium permeating the walls and extending from the inlet end towards the outlet end to a length that is less than the axial length of the walls to provide an inlet zone in an amount sufficient to periodically light off fuel at less than about 300° C. and generate an exotherm to burn soot trapped in the wall flow monolith, wherein active regeneration of the wall flow monolith can be accomplished by the wall flow monolith alone, without a separate upstream, light off oxidation catalyst;

disposing a NOx reducing catalyst downstream from the wall flow monolith; and periodically introducing an exotherm-producing agent upstream of the wall flow monolith to generate an exotherm in the wall flow monolith sufficient to combust particulate matter trapped within the wall flow monolith.

29. An emission treatment system for treatment of an exhaust stream comprising $NO_x$ and particulate matter, the emission treatment system comprising:

a substrate in the form of a wall flow monolith having a plurality of passages and elements for trapping particulate contained in an exhaust stream flowing through the filter, the substrate having an inlet end and an outlet end, the inlet end of the substrate having a quantity of platinum group metal composition comprising platinum and palladium disposed thereon present in a loading amount of at least about 40 g/ft$^3$ and extending for less than about 50% of the axial length of the filter to periodically light off fuel at a temperature of less than about 300° C. and to produce an exotherm sufficient to burn off trapped particulate in the wall flow monolith; and a NOx reducing catalyst located downstream from the wall flow monolith.

30. The emission treatment system of claim 29, the platinum and palladium are present in a ratio being in the range of about 10:1 and 1:2.

31. The emission treatment system of claim 29, wherein the light-off oxidation catalyst comprises platinum and palladium.

32. The emission treatment system of claim 31, the platinum and palladium are present in a ratio being in the range of about 10:1 and 1:2.

* * * * *